US011125607B1

(12) United States Patent
Justice et al.

(10) Patent No.: US 11,125,607 B1
(45) Date of Patent: Sep. 21, 2021

(54) INTEGRATED MULTI-LANE WEIGHT MEASURING DEVICE

(71) Applicant: AMAZON TECHNOLOGIES, INC., Seattle, WA (US)

(72) Inventors: Gregory Kim Justice, Bremerton, WA (US); Dan Beltzer, Issaquah, WA (US); Zihui Zhang, Seattle, WA (US); Nicholas Franklin, Maple Valley, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 173 days.

(21) Appl. No.: 16/427,072

(22) Filed: May 30, 2019

(51) Int. Cl.
| | |
|---|---|
| *G01G 19/414* | (2006.01) |
| *G01G 21/22* | (2006.01) |
| *G01G 21/23* | (2006.01) |
| *G06Q 10/08* | (2012.01) |

(52) U.S. Cl.
CPC ......... *G01G 21/22* (2013.01); *G01G 19/4144* (2013.01); *G01G 21/23* (2013.01); *G06Q 10/087* (2013.01)

(58) Field of Classification Search
CPC .... G01G 21/22; G01G 21/23; G01G 19/4144; G06Q 10/087
See application file for complete search history.

(56) References Cited

U.S. PATENT DOCUMENTS

| | | | | |
|---|---|---|---|---|
| 5,837,946 | A * | 11/1998 | Johnson | ............... G01G 3/1404 177/136 |
| 7,225,980 | B2 | 6/2007 | Ku et al. | |
| 7,949,568 | B2 | 5/2011 | Fano et al. | |
| 8,009,864 | B2 | 8/2011 | Linaker et al. | |
| 8,189,855 | B2 | 5/2012 | Opalach et al. | |
| 8,630,924 | B2 | 1/2014 | Groenevelt et al. | |
| 9,235,928 | B2 | 1/2016 | Medioni et al. | |
| 9,473,747 | B2 | 10/2016 | Kobres et al. | |
| 10,001,402 | B1 * | 6/2018 | Gyori | ..................... G01G 21/22 |
| 10,064,502 | B1 * | 9/2018 | Gyori | ..................... H04W 4/80 |
| 10,121,121 | B1 * | 11/2018 | De Bonet | ............ A47B 57/406 |
| 10,466,095 | B1 * | 11/2019 | O'Neill | ............. G01G 19/4144 |

(Continued)

OTHER PUBLICATIONS

Asthana, et al. "An Indoor Wireless System for Personalized Shopping Assistance" CiteSeerX, In Proceedings of IEEE Workshop on Mobile Computing Systems and Applications, 1994. Retrieved from the Internet: http://citeseerx.ist.psu.edu/viewdoc/summary?doi=10.1.1.127.3033&rank=1.

(Continued)

*Primary Examiner* — Randy W Gibson
(74) *Attorney, Agent, or Firm* — Lindauer Law, PLLC

(57) ABSTRACT

A fixture includes a crossbar to which a plurality of brackets are attached. Accessories such as wire hooks, shelves, bins, and so forth may be supported by one or more brackets. Each of the brackets may comprise an accessory support piece and at least one load cell arm which in turn is attached to the crossbar. A load cell sensor affixed to the load cell arm generates a signal that is indicative of weight changes to the bracket as items are added or removed from the accessory. The accessory support piece may include features such as tabs that prevent accessories from moving laterally. The accessory support piece may accommodate accessories of different sizes that in turn may support items of different sizes.

20 Claims, 12 Drawing Sheets

(56) References Cited

U.S. PATENT DOCUMENTS

| | | | | |
|---|---|---|---|---|
| 10,732,026 | B1* | 8/2020 | Danenberg | G01G 21/00 |
| 10,746,589 | B1* | 8/2020 | Danenberg | G01G 19/42 |
| 10,809,122 | B1* | 10/2020 | Danenberg | G01G 21/23 |
| 2003/0047603 | A1* | 3/2003 | Lustenberger | G01G 19/42 |
| | | | | 235/385 |
| 2011/0011936 | A1 | 1/2011 | Morandi et al. | |
| 2012/0284132 | A1 | 11/2012 | Kim et al. | |
| 2013/0284806 | A1 | 10/2013 | Margalit | |
| 2015/0086107 | A1 | 3/2015 | Dedeoglu et al. | |
| 2016/0048798 | A1* | 2/2016 | Meyer | G01G 19/4144 |
| | | | | 705/28 |

OTHER PUBLICATIONS

Kalnikaite, et al., "How to Nudge In Situ: Designing Lambent Devices to Deliver Information Salience in Supermarkets", ACM, In proceeding of: UbiComp 2011:Ubiquitous Computing, 13th International Conference, UbiComp 2011, Beijing, China, Sep. 17-21, 2011, 10 pages. Retrieved from the Internet: http://www.researchgate.net/publication/221568350_How_to_nudge_in_Situ_designing_lambent_devices_to_deliver_salient_information_in_supermarkets.

Pop, Cristian, "Introduction to the BodyCom Technology" AN1391, DS01391A, Microchip Technology, Inc., May 2, 2011. Retrieved from the Internet: http://www.microchip.com//wwwAppNotes/AppNotes.aspx?appnote=en555156.

Vu, et al., "Distinguishing Users with Capacitive Touch Communication" WINLAB, Rutgers University, In proceedings of: The 18th Annual international Conference on Mobile computing and networking. pp. 197-208. Aug. 2012. Retrieved from the Internet: http://www.winlab.rutgers.edu/~janne/capacitivetouch_mobicom12.pdf.

* cited by examiner

INTEGRATED MULTI-LANE WEIGHT MEASURING DEVICE

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other distribution pathways (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor quantity of inventory at various places within the facility.

BRIEF DESCRIPTION OF FIGURES

The detailed description is set forth with reference to the accompanying figures. The use of the same reference numbers in different figures indicates similar or identical items or features. The figures are not necessarily drawn to scale, and in some figures, the proportions or other aspects may be exaggerated to facilitate comprehension of particular aspects.

Figure 1A:
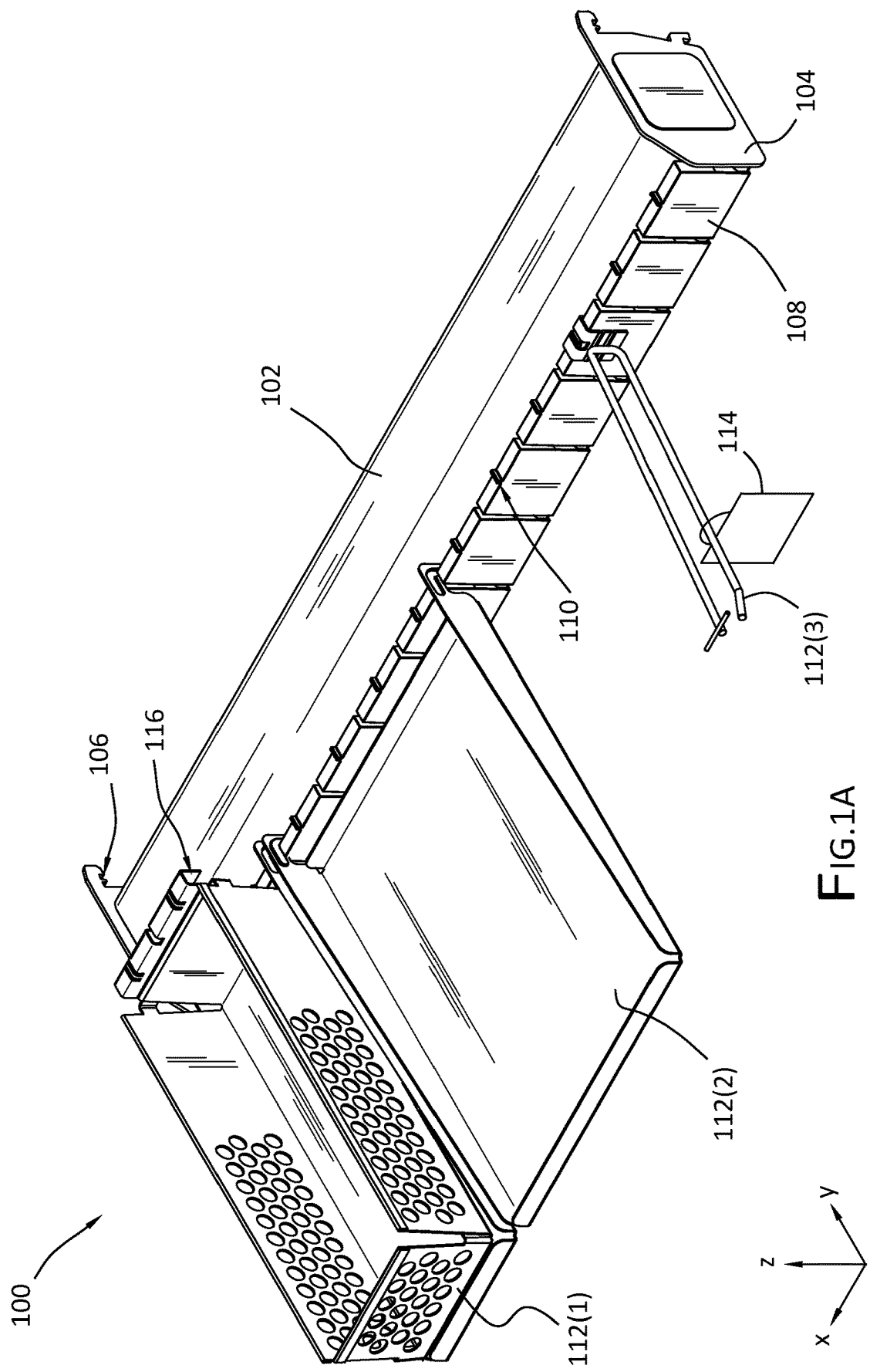
FIG. 1A illustrates a perspective view of an integrated multi-lane weight measuring device with accessories, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

A materials handling facility (facility) or other setting may utilize fixtures that are used to stow or otherwise hold items. Items may be arranged into lanes. For example, a set of the same type of item that extends from the front of a fixture to the back may be deemed a lane. The fixtures, such as gondolas or racks, are equipped with an integrated multi-lane weight measuring device that generates weight data. The multi-lane weight measuring device may include one or more weight sensors and associated electronics. During operation, the integrated multi-lane weight measuring device generates weight data and sends that weight data using a communication interface to another device, such as a server.

A fixture may contain one or more of the integrated multi-lane weight measuring devices. For example, a gondola may have six integrated multi-lane weight measuring devices affixed to it. Each integrated multi-lane weight measuring device includes a plurality of brackets. Each bracket may comprise an accessory support piece and a weight sensor, such as a load cell. The weight on each bracket is measured by the weight sensor.

An accessory provides physical support for one or more items and includes an accessory mount feature that engages at least a portion of the accessory support piece. For example, the accessory may include a shelf, bin, hanger, and so forth. The accessory includes one or more bracket engagement features. The bracket engagement feature engages at least a portion of the accessory support piece and holds the accessory with respect to the bracket. The accessory is thus supported, at least in part, by the bracket, and weight on the bracket is measured by the one or more weight sensors associated with the bracket. The weight sensors provide data that is indicative of the weight on the accessory. In some implementations each bracket may have a separate accessory. Each accessory in turn may support a single type of item. In other implementations a single accessory may be supported by two or more brackets.

The integrated multi-lane weight measuring device comprises a crossbar and one or more end pieces with shelf hooks. The crossbar may be fabricated by extrusion and may include several features. These features may include channels on front and back surfaces and grooves on top and bottom surfaces. The channels provide improved structural rigidity and features for joining components of the device. The grooves provide alignment features that improve alignment during fabrication, such as drilling holes through which bolts which join a bracket to the crossbar may pass.

A first end of each bracket is affixed to a bottom side of the crossbar. The end pieces are affixed to one or more ends of the crossbar. Shelf hooks may extend from end pieces, allowing the integrated multi-lane weight measuring device to be attached to a gondola, rack, or other support. The device may include circuitry within the housing that generates weight data based on output from the weight sensors. A cover may be placed on the housing, concealing and protecting interior components from contaminants.

The use of the extruded crossbar allows the size of the device to be physically scaled to different sizes with ease. For example, to make a wider device, a longer extrusion is used. Use of the extruded crossbar reduces fabrication and assembly costs. For example, the grooves in the crossbar allow for improved alignment of holes or other fasteners that may be used to join components of the device.

The components of the device may be joined using mechanical fasteners. The mechanical fasteners may be removeable. For example, bolts or screws may be used to join the brackets to the crossbar, the end pieces to the crossbar, and so forth. As a result, the device is easy to assemble and easy to maintain. For example, after installation if a bracket fails, the bracket may be easily removed and replaced.

The overall design of the device is compact, minimizing the volume used by the device. For example, the arrangement of having the weight sensors mounted to an underside of the crossbar minimizes the distance front-to-back of the device, leaving more space available for storing items.

The facility may include, or have access to, an inventory management system. The inventory management system may use data from the sensors at or near the fixture, such as the weight data from the integrated multi-lane weight measuring devices, to determine interactions in the facility. Interactions may comprise the user picking an item from a fixture, placing an item at a fixture, touching an item, and so forth. For example, the inventory management system may generate interaction data that indicates what type and quantity of item a user picked from a particular part of the fixture, and then use this interaction data to adjust the count of inventory stowed at the particular fixture.

The integrated multi-lane weight measuring device described in this disclosure provides several significant advantages. The ability to gather weight data associated with a particular lane as supported by a particular bracket, allows for specific information as to the location of the weight change. For example, the weight change data for a change in weight at a particular bracket may be generated. The inventory management system may lookup which type of item is associated with that particular bracket, and determine a quantity of that type of item that was picked or placed. As a result, overall accuracy of the inventory management system is improved.

The integrated multi-lane weight measuring device is modular, allowing for significant flexibility during deployment and reconfiguration. For example, the accessory support piece on the brackets allows a wide variety of different types of accessories to be attached without the use of tools and without removing the device from service. Accessories of different sizes may be comingled on a single device, such as having single lane hangers, each supported by a separate bracket, or multi-lane accessories such as a shelf that spans across six brackets. The device may also be constructed to comply with food safety regulations, allowing for use with edible items. For example, the cover may enclose the crossbar, weight sensors, and so forth, leaving the accessory support piece available for use by the accessories.

The unit is relatively inexpensive to manufacture, comprising a minimal number of different pieces. The device is mechanically rugged and able to withstand the stresses associated with use in a commercial environment.

By using the devices and techniques described herein, operation of the facility may be improved. For example, the inexpensive and modular devices may be installed and reconfigured to meet changing types or arrangements of items. The devices provide accurate weight data with a location resolution down to a particular lane, that may be used for inventory management. The devices also use a relatively small volume, maximizing the amount of storage space available for items.

Illustrative System

FIG. 1A illustrates a perspective view showing a front of an integrated multi-lane weight measuring device (device) 100, according to some implementations. A cover 102 is shown. The cover 102 may be used to conceal a crossbar and other components of the device that are described herein.

A left end piece 104 and a right end piece 104 are shown. Each end piece 104 is attached to the crossbar. Each end piece 104 may include one or more shelf hooks 106 that extend away from a back side of device 100. The shelf hooks 106 may have a shape and relative distance from one another that are compatible with upright supports. For example, the shelf hooks 106 may allow the device 100 to be mounted to, and supported by, uprights on a gondola shelving unit (not shown).

Figure 2A:
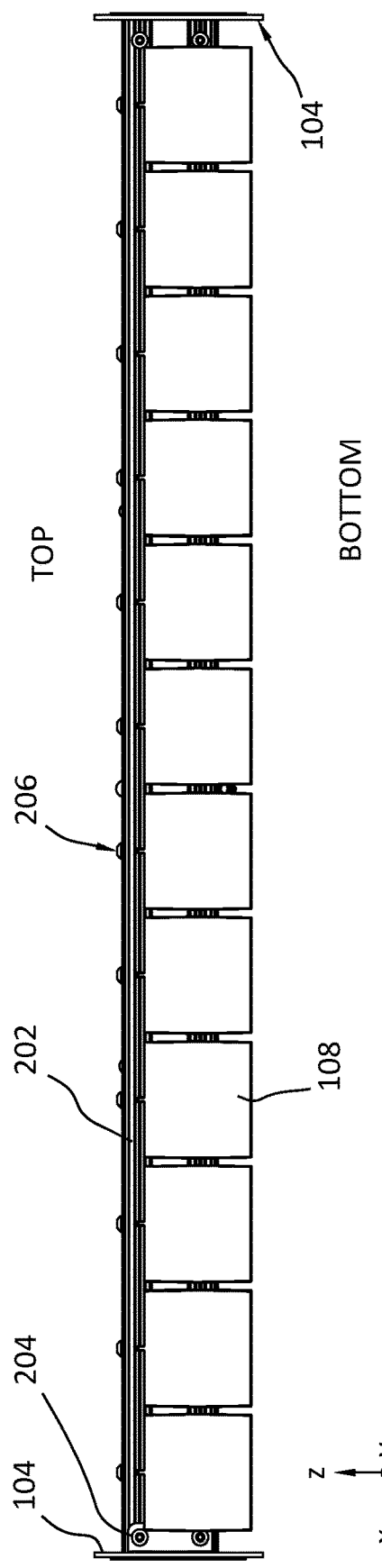
FIG. 2A illustrates a front view of the integrated multi-lane weight measuring device, according to some implementations.
Figure 2B:
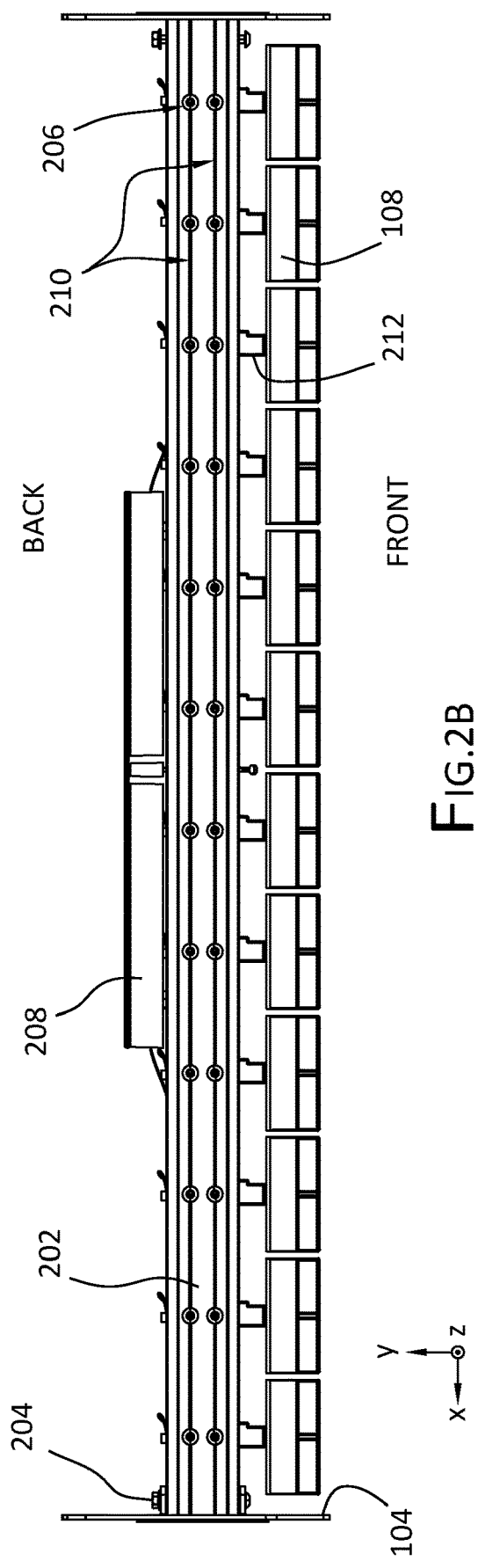
FIG. 2B illustrates a top view of the integrated multi-lane weight measuring device, according to some implementations.

The device 100 includes a plurality of brackets (see FIG. 2B). These brackets extend from underneath the bottom of the crossbar towards a front of the device. The end of the bracket that is in front of the crossbar includes an accessory support piece 108. The accessory support piece 108 may also include one or more lateral retention features 110, such as a tab that extends upward from the accessory support piece 108. The accessory support piece 108 is described in more detail herein.

An accessory 112 may be supported by one or more of the accessory support pieces 108 of the respective brackets. The accessory 112 may comprise one or more of a hook, bin, basket, shelf, autofacing unit, or dispenser. For example, the accessory 112(1) comprises a basket, accessory 112(2) comprises a shelf, and accessory 112(3) comprises a wire hook. One or more items 114 may be stowed in or supported by the accessory 112 during use.

The accessory 112 includes a bracket engagement feature 116 that mechanically engages a portion of the accessory support piece 108. Once so engaged, the accessory 112 is supported by the bracket. For example, the accessory support piece 108 may comprise a portion of the bracket that is generally rectangular in cross section and having a thickness. A space is provided between the back of the accessory support piece 108 and a front of the cover 102. This space provides room for the bracket engagement feature 116 to pass during installation and removal. In other implementations, other cross sections may be provided. In this illustration, the bracket engagement feature 116 has a front portion that extends down at least a portion of a front of the accessory support piece 108 and a rear portion that extends down at least a portion of a rear of the accessory support piece 108 when engaged.

To prevent the accessory 112 from sliding laterally with respect to the housing (left to right), the accessory 112 may include a bracket engagement feature that interacts with the lateral retention feature 110 to prevent such motion. For example, the bracket engagement feature 116 of the accessory 112 may include a hole, through which the lateral retention feature 110 protrudes when the accessory 112 is supported by the bracket.

While FIG. 1A shows some number of accessory support pieces 108, other implementations may have a larger or smaller number of accessory support pieces 108. An individual accessory 112 may span several brackets while being supported by one or more of the brackets. For example, if each accessory support piece 108 is 3 inches wide, and a shelf accessory 112(2) is 9 inches wide, the shelf accessory 112(2) may span three accessory support pieces 108. Continuing the example, to avoid overconstraining the motion of the accessory 112, the shelf accessory 112(2) may be supported by only one or two accessory support pieces 108, and not transfer a vertical load onto the remaining spanned accessory support pieces 108.

As described in this disclosure, components may be affixed or otherwise joined to one another in several ways. For example, two components may have complementary features that mechanically engage one another, such as a tab and corresponding slot. In another example, fasteners such as rivets, bolts, screws, cams, and so forth may be used. These may be removable fasteners such as bolts and screws that allow components to be joined and disjoined as needed. In yet another example two or more components may be attached using adhesives, welding, and so forth.

Figure 1B:
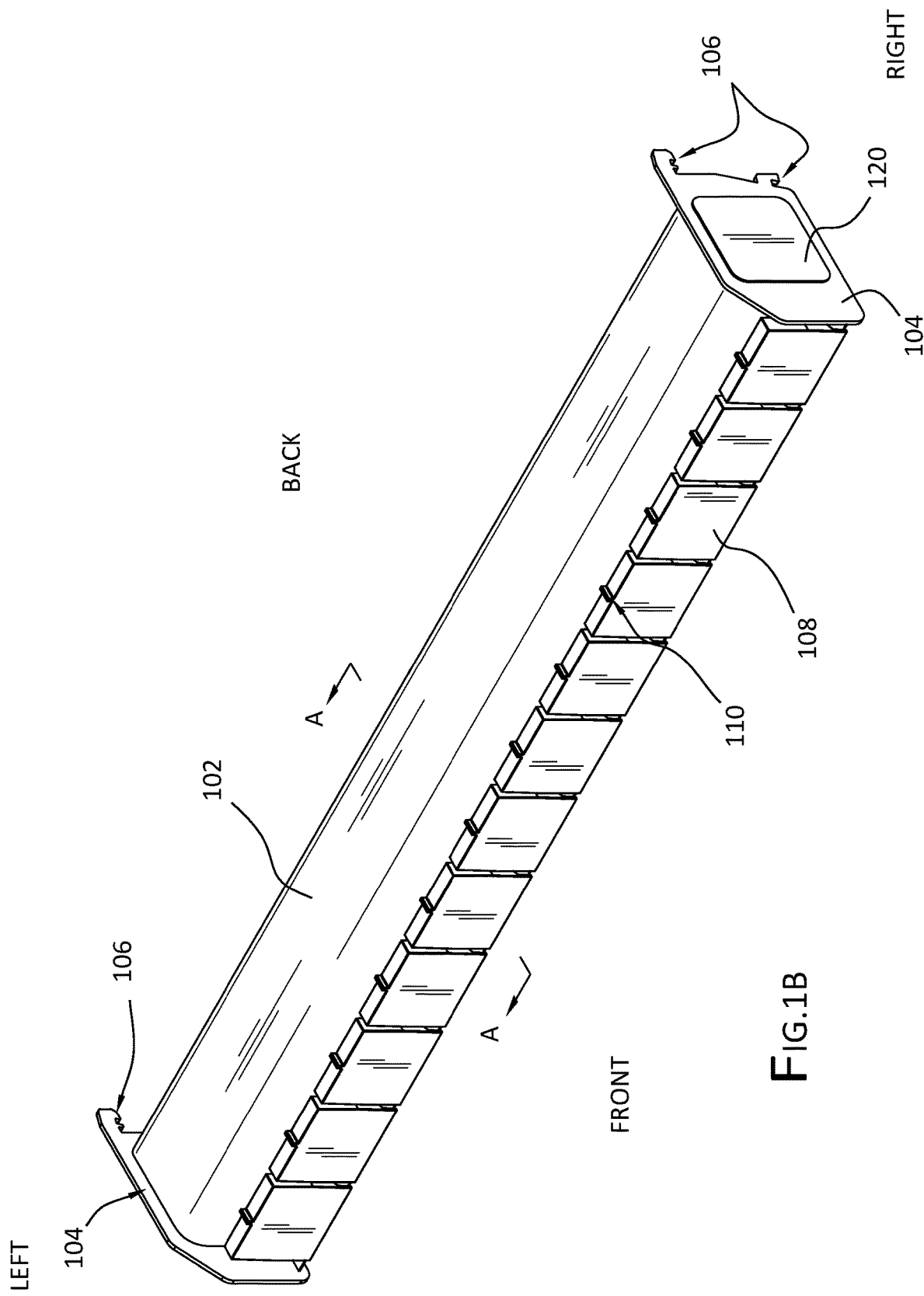
FIG. 1B illustrates the perspective view of the integrated multi-lane weight measuring device, according to some implementations.

FIG. 1B illustrates the perspective view of the device 100 without accessories 112, according to some implementations. In this view the twelve accessory support pieces 108 are visible, as are their respective lateral retention features 110. Also shown is a cap 120 that is inserted into a hole of the end piece 104. The end piece 104 may include one or more flanges. The cap 120 may be used to fill the hole remaining after fabrication of the flanges. The cap 120 may include one or more mechanical engagement features. For example, the cap 120 may comprise a plastic with a ridge or other feature that may engage at least a portion of an edge of the hole into which the cap 120 is inserted. The end piece 104 is discussed in more detail with regard to FIG. 6. In another implementation the cap 120 may comprise a sheet of material that is attached to the end piece 104 using an adhesive. For example, the cap 120 may comprise a sticker that is placed over the hole in the end piece 104.

Figure 3:
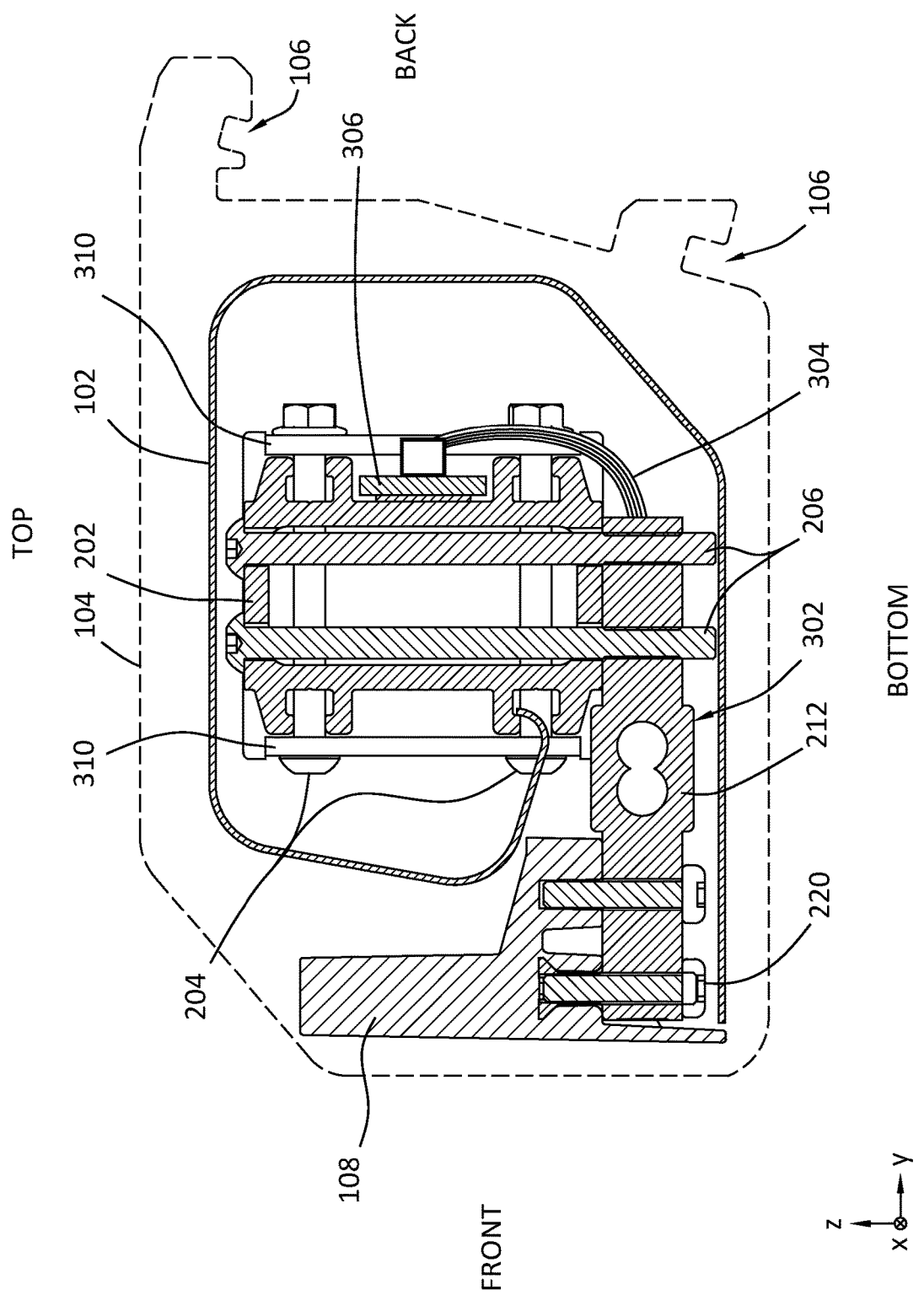
FIG. 3 illustrates a cross section of the integrated multi-lane weight measuring device, according to some implementations.

A cross section along line A-A is shown in FIG. 3.

FIG. 2A illustrates a front view of the device 100 with the cover 102 removed, according to some implementations. In this view the crossbar 202 is visible. Also visible are removeable fasteners, such as bolts 204 that attach the end piece 104 to the crossbar 202. The removeable fasteners which join the crossbar 202 to the bracket, such as bolts 206, are also visible.

FIG. 2B illustrates a top view of the device 100 with the cover 102 removed, according to some implementations. A top of the crossbar 202 is visible, as are the bolts 204 and 206.

An electronics enclosure 208 is shown attached to a back side of the crossbar 202. The electronics enclosure 208 may include the electronics used to operate the weight sensor and provide weight data as output. For example, the circuitry may generate weight data indicative of a load on the accessory support piece 108.

A pair of linear features 210 are shown on the top of the crossbar 202. The linear features 210 may comprise a groove. The groove may be formed during the extrusion of the crossbar 202 or another production process such as cutting, grinding, etching, and so forth may be used to form the groove. The linear features 210 extend from the left end to the right end of the crossbar 202. In the implementations depicted in this and the following figures, a matching set of linear features 210 may also be present on the bottom side of the crossbar 202.

The bracket comprises the accessory support piece 108 and a weight sensor. The weight sensor may comprise an arm 212 which is partially visible in this figure. The arm 212 may comprise a structural member with a load cell sensor, such as a strain gauge sensor, attached. For example, the weight sensor may comprise a single point load cell.

Figure 2C:
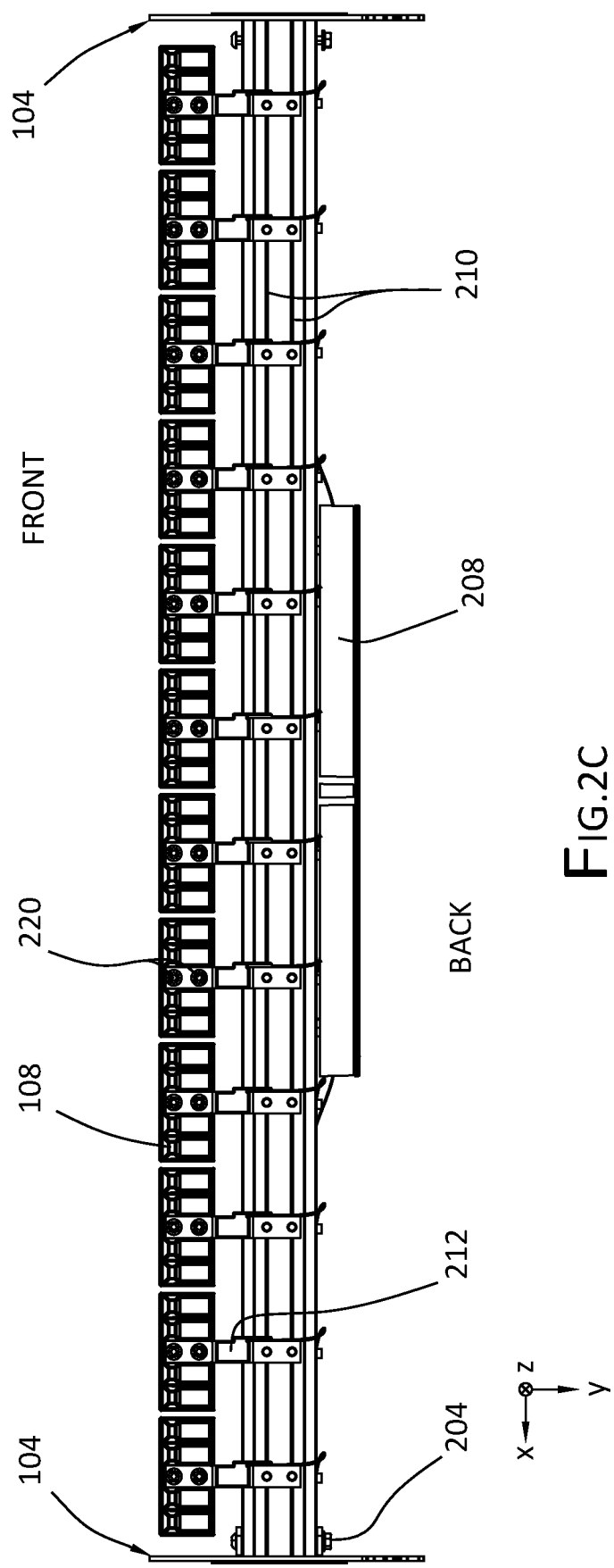
FIG. 2C illustrates a bottom view of the integrated multi-lane weight measuring device, according to some implementations.

FIG. 2C illustrates a bottom view of the device 100 with the cover 102 removed, according to some implementations. In this illustration, removable fasteners 220, such as screws or bolts, are visible that join the arm 212 to the accessory support piece 108.

FIG. 3 illustrates a cross section of the device 100 along line A-A of FIG. 1B, according to some implementations. An outline of the end piece 104 with the shelf hooks 106 is shown with a broken line. A weight sensor 302 comprising the arm 212 and the accessory support piece 108 is shown here. For example, the arm 212 may comprise a load cell arm with a strain concentration feature comprising a hole in the arm 212. A first end of the weight sensor 302 is attached to the bottom side of the crossbar 202.

The weight sensors 302 may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 302 may operate as transducers that generate one or more signals based on an applied force, such as that of the load due to gravity. For example, the weight sensor 302 may comprise a strain gauge and a structural member that deforms slightly when weight is applied. The strain gauge may be bonded to or otherwise affixed to the structural member. As weight is applied, the structural member is deformed, which also results in deformation of the strain gauge. By measuring a change in the electrical characteristic of the strain gauge, such as capacitance or resistance, the weight may be determined. For example, a lookup table may relate a particular electrical resistance value to a particular weight. In another example, the weight sensor 302 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations the weight sensor 302 may comprise a single point load cell.

In some implementations the weight sensors 302 used within the device 100 may have the same specifications. For example, each weight sensor 302 may have a maximum load rating of 20 kilograms (kg). In other implementations other weight sensors 302 with different capacities may be installed within the device 100. For example, six of the weight sensors 302 may have a maximum load rating of 20 kg while six of the weight sensors have a maximum load rating of 40 kg.

The long axis of the weight sensors 302 may be perpendicular to the long axis of the crossbar 202. For example, the long axis of the crossbar 202 may extended left and right while the long axis of individual weight sensors 302 extends front to back. In some implementations, such as shown here, the long axes of the weight sensors 302 may be parallel to one another.

The extruded crossbar 202 is illustrated showing the front side, the back side, the top side, and the bottom side. The cover 102 is shown. The cover 102 may engage one of the features on the crossbar 202, such as shown here. The weight sensor 302 may comprise a load cell with a load cell sensor. The load cell sensor may be connected via wiring 304 to a backplane 306 comprising one or more electrical conductors. For example, the wiring 304 may comprise a wiring harness, flexible printed circuit, and so forth. The backplane 306 may be arranged within a recess on a back side of the crossbar 202. The backplane 306 may provide electrical connectivity to the electronic devices in the electronics enclosure 208. For example, the backplane 306 may comprise a printed circuit board with connectors to couple to the wiring 304.

Also shown in this cross section are the bolts 204 that attach the crossmember 202 to the end piece 104. The end piece 104 may include one or more flanges 310. For example, to attach the crossmember 202 to the end piece 104, a bolt passes horizontally through a hole in a flange 310, through corresponding holes in the crossmember 202, and through a hole in another flange 310. A nut may be used to secure the bolt 204.

Also shown are the bolts 206 that join the crossmember 202 to a first end of the weight sensor 302. As shown here, bolt 206 passes vertically through the crossbar 202 and to a first end of the arm 212. The bolts 206 may be secured using a nut (not shown) or may be threaded on the end and engage corresponding threads in the arm 212.

Figure 4A:
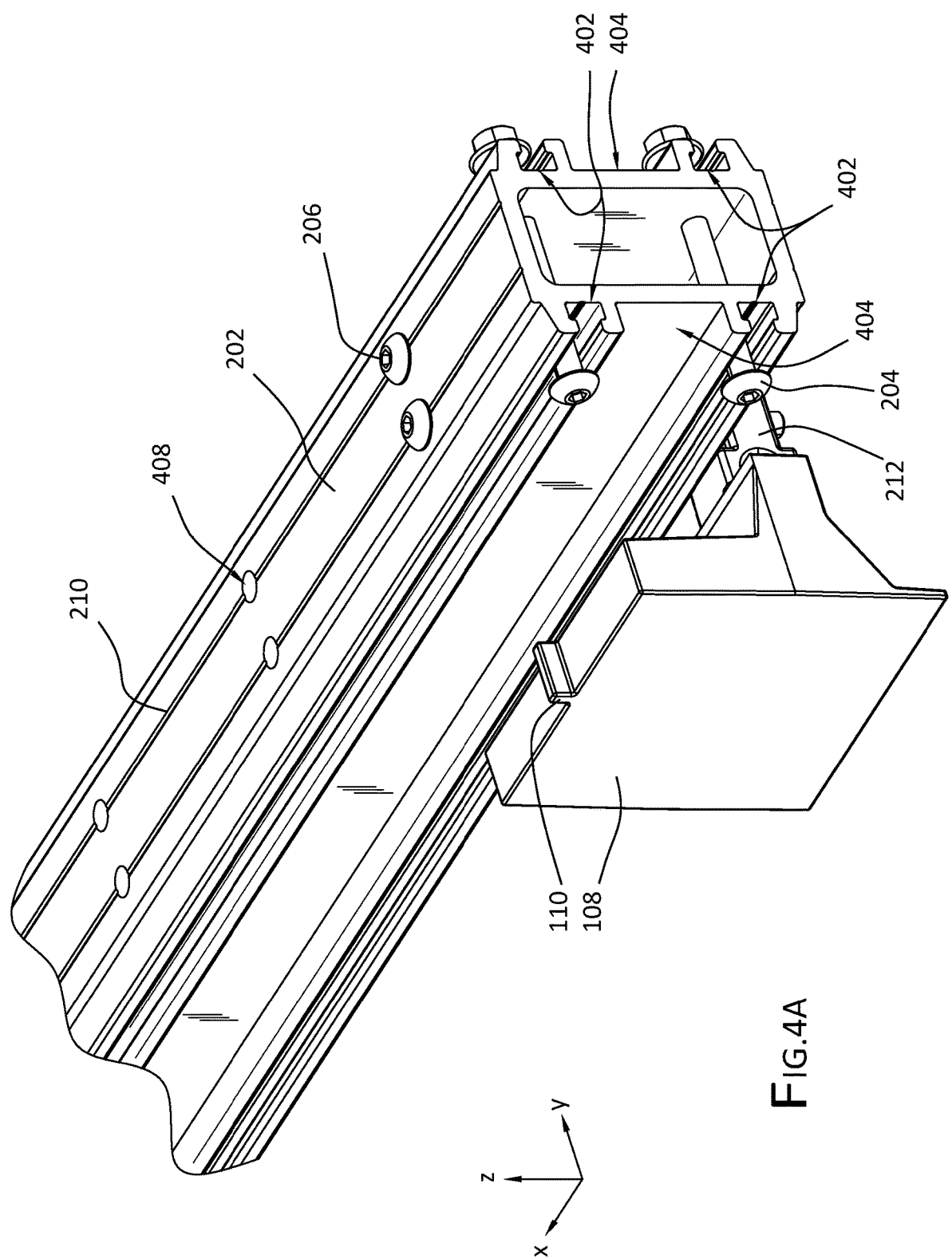
FIG. 4A illustrates an enlarged perspective view from the front of a crossbar and a bracket, according to some implementations.

FIG. 4A illustrates an enlarged perspective view from the front of a crossbar 202 and a bracket comprising the accessory support piece 108 and the weight sensor 302, according to some implementations.

Shown in this view are channel features 402 that extend from the front and back sides of the crossbar 202. In the implementation shown, the channel features 402 may have a cross section perpendicular to a long axis of the crossbar 202 that comprises a first width of an interior space and a second width of an opening that is less than the first width. This produces a "T" cross section, with the base of the "T" being open to the surrounding environment.

A first channel feature 402 extends from the front side of the crossbar 202 proximate to the top side of the crossbar 202, a second channel feature 402 extends from the front side of the crossbar 202 proximate to the bottom side of the crossbar 202, a third channel feature 402 extends from the back side of the crossbar 202 proximate to the top side of the crossbar 202, and a fourth channel feature 402 extends from the back side of the crossbar 202 proximate to the bottom side of the crossbar 202. As shown here, in some implementations the crossbar 202 may be symmetrical with respect to a vertical axis and with respect to a horizontal axis. For example, the first channel feature 402 is mirrored by the third channel feature 402 while the second channel feature 402 is mirrored by the fourth channel feature 402.

A recess 404 is provided between the channel features on the same side of the crossbar 202. For example, the recess 404 is formed by the third and fourth channel features 402.

The linear features 210 on the top side of the crossbar 202 are visible as well. One or more holes 408 may be provided through which the bolts 206 or other removeable fastener used to attach the arm 212 to the crossbar 202 may pass. The holes 408 may be centered on the linear features 210. During fabrication, the linear features 210 may assist in the alignment of the holes 408. For example, during fabrication, a drill may be used to cut the holes 408. The linear feature 210 may comprise a groove, and the sides of the groove may assist in guiding a drill bit, improving the alignment of the holes 408.

The removeable fasteners that join the end piece 104 to the crossbar 202, such as bolts 204, are also shown here. The body of the fastener passes through the channel features 402.

Figure 4B:
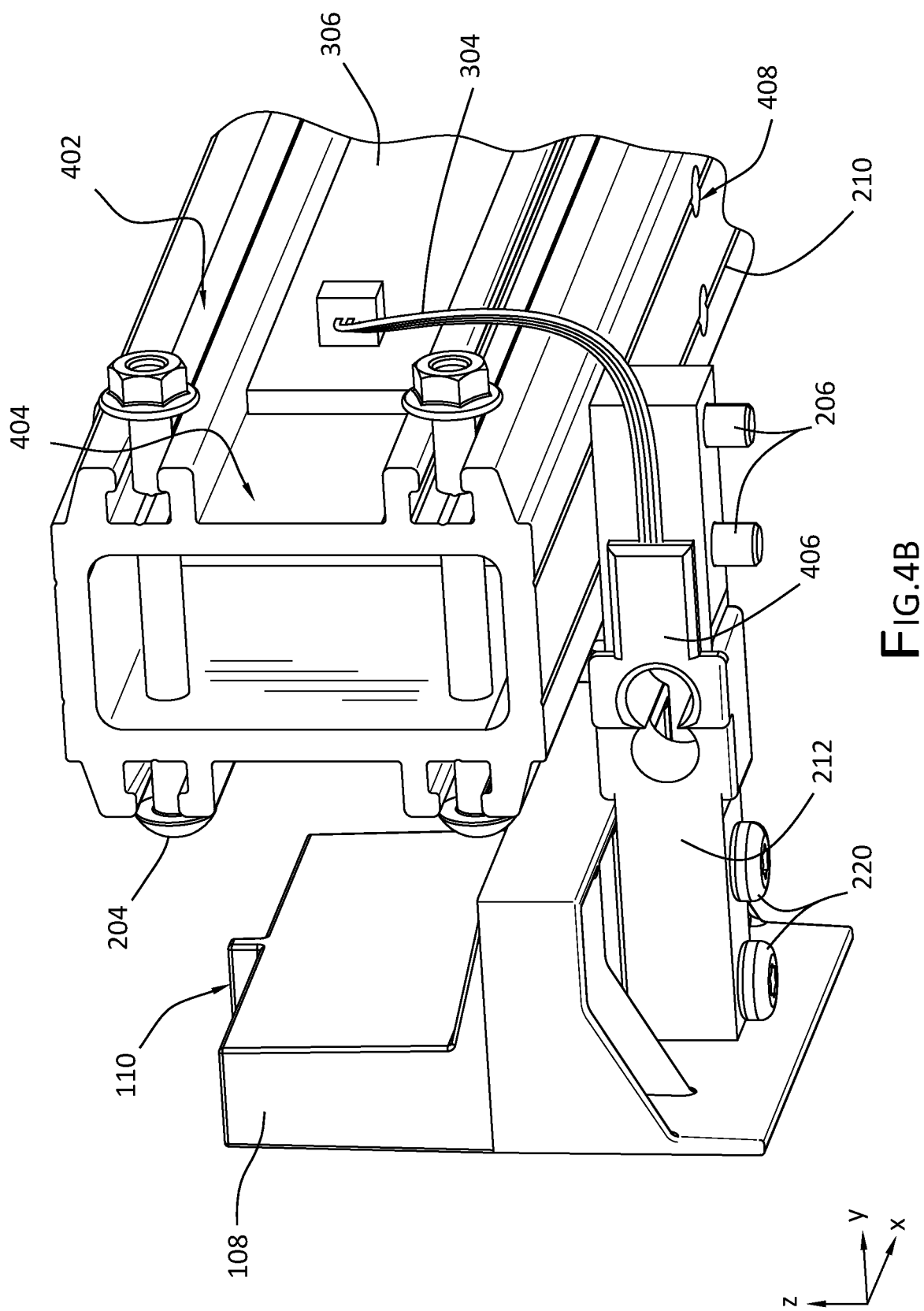
FIG. 4B illustrates an enlarged perspective view from the rear of a crossbar and a bracket, according to some implementations.

FIG. 4B illustrates an enlarged perspective view from the back of the crossbar 202 and a bracket comprising the accessory support piece 108 and the weight sensor 302, according to some implementations.

In this view the channel features 402 on the back side of the crossbar 202 are visible, as is the recess 404. Arranged within the recess 404 is the backplane 306.

Shown is one implementation of the weight sensor 302. In this implementation, the weight sensor 302 comprises the arm 212 with an attached load cell sensor 406. For example, the load cell sensor 406 may comprise a strain gauge that is affixed to a side of the arm 212. A first end of the arm 212 is attached to the crossbar 202 while a second end of the arm 212 is attached to the accessory support piece 108.

The accessory support piece 108 may be formed in some implementations with a casting process. In other implementations, the accessory support piece 108 may be machined from another material, formed using additive manufacturing techniques, and so forth.

In some implementations, the bracket may comprise a unitary piece. For example, the accessory support piece 108 and the arm 212 may comprise a single structure. The load cell sensor 406 may be incorporated into, or attached to, the single structure.

The linear features 210 on the bottom side of the crossbar 202 are visible as well. One or more holes 408 may be provided through which the bolts 206 or other removeable fastener used to attach the arm 212 to the crossbar 202 may pass.

Figure 5:
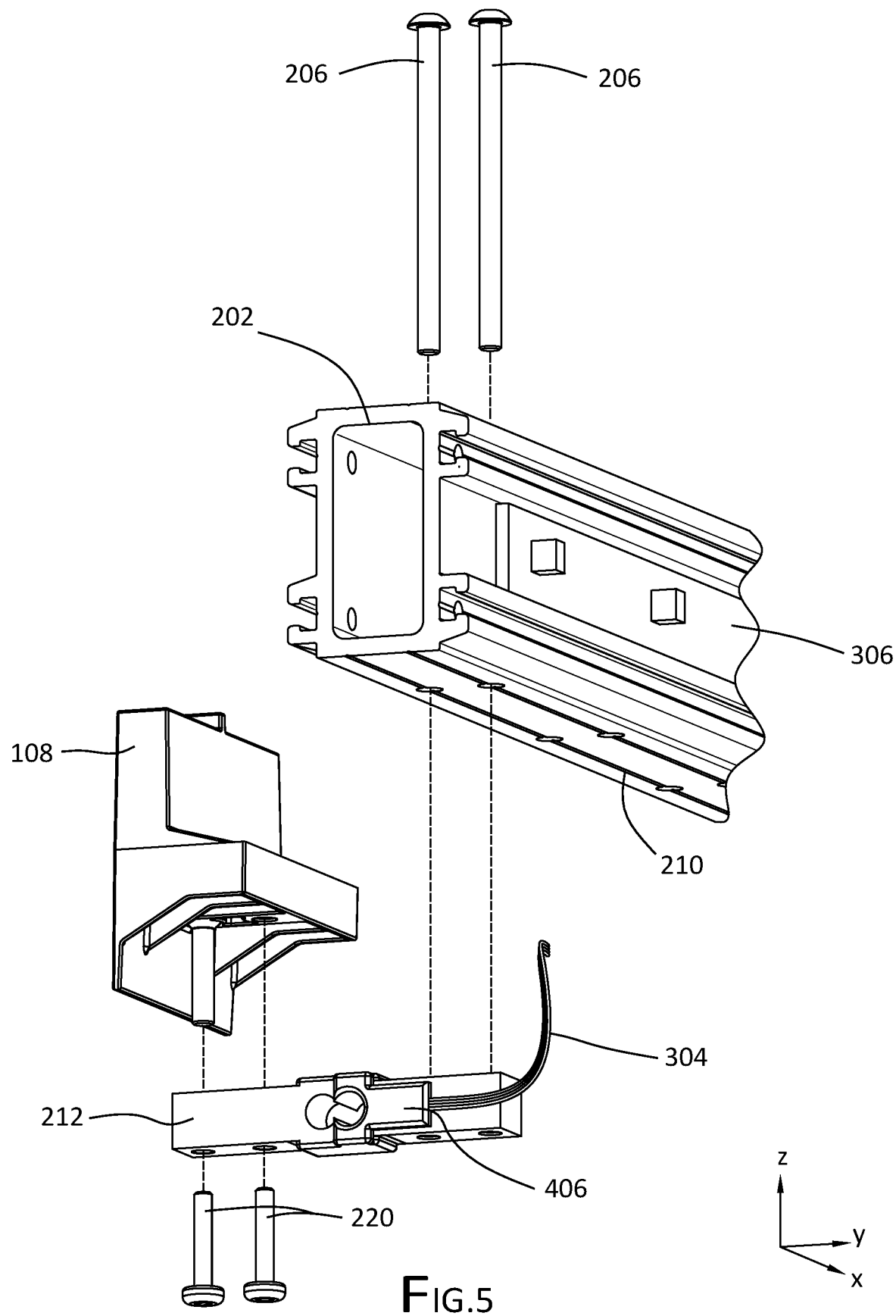
FIG. 5 is an exploded view of an enlarged perspective of the crossbar and a bracket, according to some implementations.

FIG. 5 is an exploded view of an enlarged perspective of the crossbar 202 and the components of the bracket, according to some implementations. In this view a bottom side of the accessory support piece 108 attached by the removeable fasteners, such as screws 220, to a second end of the arm 212 is shown. The load cell sensor 406 is affixed to the arm 212 to provide the weight sensor 302. The wiring 304 extends from the load cell sensor 406. A first end of the arm 212 is attached by the bolts 206 to the bottom side of the crossbar 202.

Figure 6:
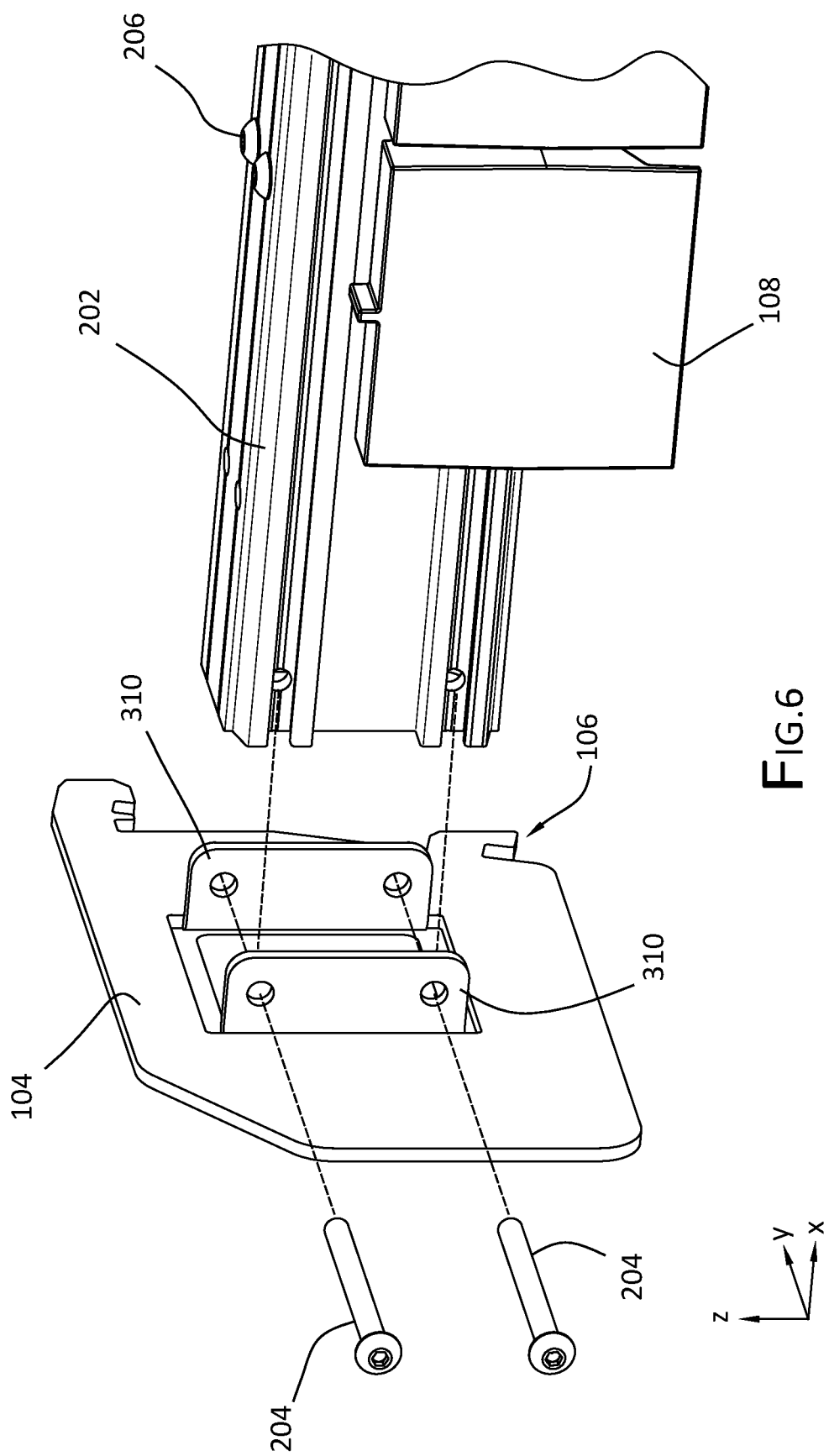
FIG. 6 is an exploded view of an enlarged perspective of the end piece with shelf hooks, according to some implementations.

FIG. 6 is an exploded view of an enlarged perspective of the end piece 104 with shelf hooks 106, according to some implementations. The end piece 104 may comprise one or more flanges 310 that extend from a body of the end piece 104. For example, cuts may be made in the material of the end piece 104 and the material may be bent to form the flanges 310. The end piece 104 is joined to the crossbar 202 by one or more removeable fasteners. As shown here, a pair of bolts 204 pass through holes in the flanges and the crossbar 202. Each of the bolts 204 may then be secured using a nut (not shown).

In one implementation, a left end piece 104 comprising a plurality of shelf hooks 106, a first flange 310, and a second flange 310 are attached to the left end of the crossbar 202 using removeable fasteners. For example, a first removeable fastener passes through the first flange 310, the first channel feature 402, the third channel feature 402 proximate to the left end of the crossbar 202, and the second flange 310. A second removeable fastener passes through the first flange 310, the second channel feature 402, the fourth channel feature 402 proximate to the left end of the crossbar, and the second flange 310.

Continuing the example, a right end piece 104 comprises a third flange 310, a fourth flange 310, and a plurality of shelf hooks 106. The right end piece 104 is attached to the right end of the crossbar 202 using removeable fasteners. For example, a third removeable fastener passes through the third flange 310, the first channel feature 402, the third channel feature 402 proximate to the right end of the crossbar, and the fourth flange 310. A fourth removeable fastener passes through the third flange 310, the second channel feature 402, the fourth channel feature 402 proximate to the right end of the crossbar 202, and the fourth flange 310.

Figure 7:
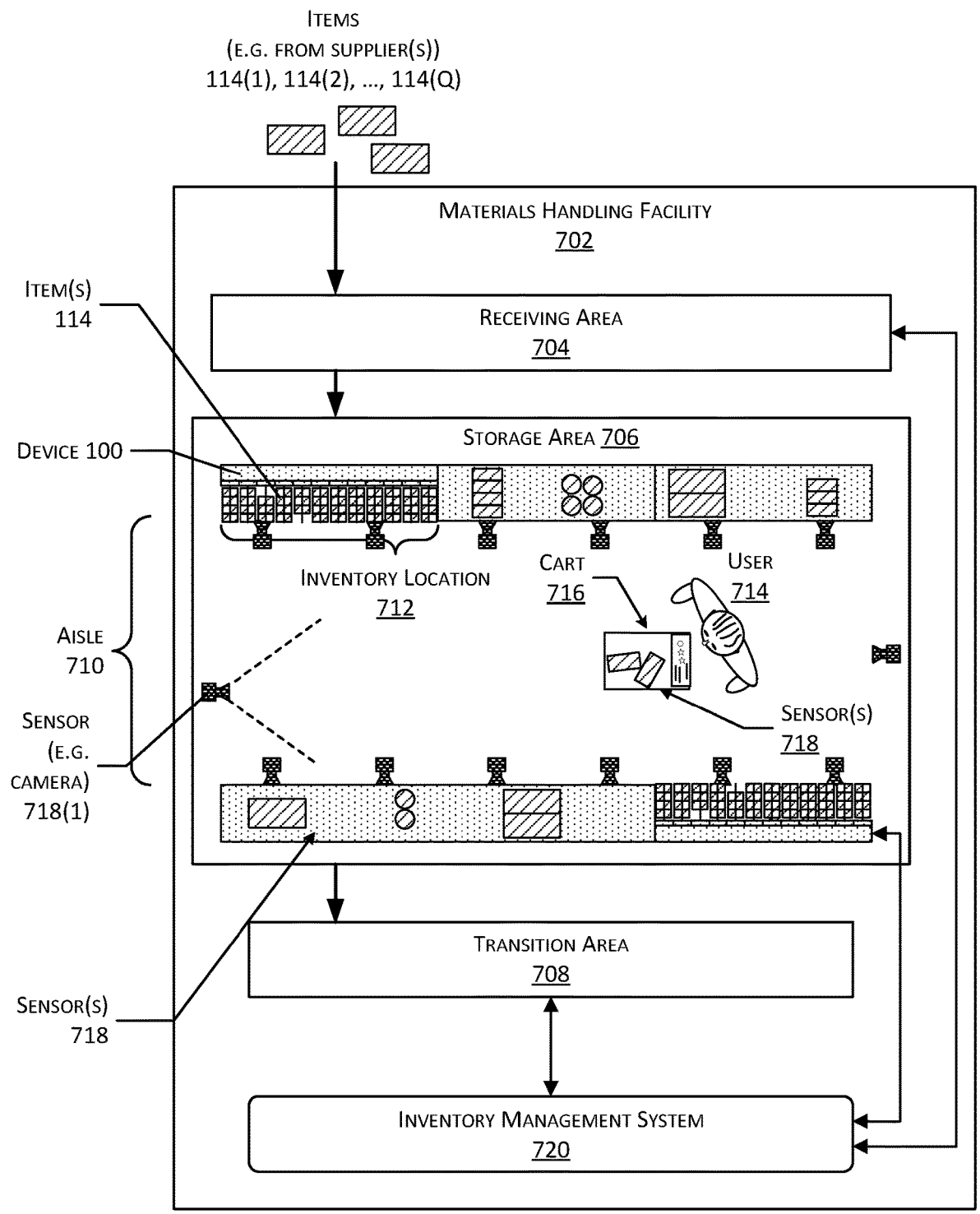
FIG. 7 is a block diagram illustrating a materials handling facility (facility) using the device, according to some implementations.

FIG. 7 is a block diagram illustrating a material handling facility (facility) 702 using the device 100, according to some implementations. A facility 702 comprises one or more physical structures or areas within which one or more items 114(1), 114(2), . . . , 114(Q) may be held. The items 114 may comprise physical goods, such as books, pharmaceuticals, repair parts, electronic gear, and so forth.

The facility 702 may include one or more areas designated for different functions with regard to inventory handling. In this illustration, the facility 702 includes a receiving area 704, a storage area 706, and a transition area 708.

The receiving area 704 may be configured to accept items 114, such as from suppliers, for intake into the facility 702. For example, the receiving area 704 may include a loading dock at which trucks or other freight conveyances unload the items 114. In some implementations, the items 114 may be processed, at the receiving area 704, to generate at least a portion of the item data 932. For example, an item 114 may be weighed, imaged or otherwise scanned to develop reference images or representations of the item 114 at the receiving area 704.

The storage area 706 is configured to store the items 114. The storage area 706 may be arranged in various physical configurations. In one implementation, the storage area 706 may include one or more aisles 710. The aisle 710 may be configured with, or defined by, inventory locations 712 on one or both sides of the aisle 710. The inventory locations 712 may include one or more of a platform, a rack, a case, a cabinet, a bin, a floor location, or other suitable storage mechanisms for holding, supporting, or storing the items 114. For example, the inventory locations 712 may comprise the device 100 with multiple accessories 112 that provide a plurality of lanes.

The inventory locations 712 may be affixed to the floor or another portion of the structure of the facility 702. The inventory locations 712 may also be movable such that the arrangements of aisles 710 may be reconfigurable. In some implementations, the inventory locations 712 may be configured to move independently of an outside operator. For example, the inventory locations 712 may comprise a rack with a power source and a motor, operable by a computing device to allow the rack to move from one location within the facility 702 to another.

One or more users 714 and carts 716 or other material handling apparatus may move within the facility 702. For example, the user 714 may move about within the facility 702 to pick or place the items 114 in various inventory locations 712, placing them in the cart 716 for ease of transport. The cart 716 is configured to carry or otherwise transport one or more items 114. For example, the cart 716 may include a basket, bag, bin, and so forth. In other implementations, other material handling apparatuses such as robots, forklifts, cranes, aerial drones, and so forth, may move about the facility 702 picking, placing, or otherwise moving the items 114. For example, a robot may pick an item 114 from a first inventory location 712(1) and move the item 114 to a second inventory location 712(2).

While the storage area 706 is depicted as having one or more aisles 710, inventory locations 712 storing the items 114, sensors 718, and so forth, it is understood that the receiving area 704, the transition area 708, or other areas of the facility 702 may be similarly equipped. Furthermore, the arrangement of the various areas within the facility 702 are depicted functionally rather than schematically. For example, in some implementations, multiple different receiving areas 704, storage areas 706, and transition areas 708 may be interspersed rather than segregated in the facility 702.

The facility 702 may include, or be coupled to, an inventory management system 720 described above. The inventory management system 720 is configured to interact with the user 714 or devices such as sensors 718, robots, material handling equipment, computing devices, and so forth, in one or more of the receiving area 704, the storage area 706, or the transition area 708.

During operation of the facility 702, the weight sensors 302 and other sensors 718 may be configured to provide sensor data 926, or information based on the sensor data 926, to the inventory management system 720. In addition to data obtained from the weight sensors 302 in the device 100, the sensor data 926 may include image data, non-image data, and so forth. The sensors 718 may include, but are not limited to, weight sensors 302, cameras 718(1), and so forth. The sensors 718 may be stationary or mobile, relative to the facility 702. For example, the facility 702 may include cameras 718(1) to obtain images of the user 714 or other objects in the facility 702. In another example, the inventory locations 712 may contain weight sensors 302 to acquire weight sensor data of items 114 stowed therein, cameras 718(1) to acquire images of picking or placement of items 114 on shelves, and so forth. The sensors 718 are described in more detail below with regard to FIG. 8.

The inventory management system 720 or other systems may use the sensor data 926 to track the location of objects within the facility 702, movement of the objects, or provide other functionality. Objects may include, but are not limited to, items 114, users 714, carts 716, and so forth. For example, a series of images acquired by the cameras 718(1) may indicate removal by the user 714 of an item 114 from a particular accessory 112 or other location at the inventory location 712 and placement of the item 114 on or at least partially within the cart 716.

The facility 702 may be configured to receive different kinds of items 114 from various suppliers and to store them until a customer orders or retrieves one or more of the items 114. A general flow of items 114 through the facility 702 is indicated by the arrows of FIG. 7. Specifically, as illustrated in this example, items 114 may be received from one or more suppliers, such as manufacturers, distributors, wholesalers, and so forth, at the receiving area 704. In various implementations, the items 114 may include merchandise, commodities, perishables, or any suitable type of item 114, depending on the nature of the enterprise that operates the facility 702.

Upon being received from a supplier at the receiving area 704, the items 114 may be prepared for storage in the storage area 706. For example, in some implementations, items 114 may be unpacked or otherwise rearranged. The inventory management system 720 may include one or more software applications executing on a computer system to provide inventory management functions. These inventory management functions may include maintaining information indicative of the type, quantity, condition, cost, location, weight, or any other suitable parameters with respect to the items 114. The items 114 may be stocked, managed, or dispensed in terms of countable units, individual units, or multiple units, such as packages, cartons, crates, pallets, or other suitable aggregations. Alternatively, some items 114, such as bulk products, commodities, and so forth, may be stored in continuous or arbitrarily divisible amounts that may not be inherently organized into countable units. Such items 114 may be managed in terms of a measurable quantity such as units of length, area, volume, weight, time, duration, or other dimensional properties characterized by units of measurement. Generally speaking, a quantity of an item 114 may refer to either a countable number of individual or aggregate units of an item 114 or a measurable amount of an item 114, as appropriate.

After arriving through the receiving area 704, items 114 may be stored within the storage area 706. In some implementations, like items 114 may be stored or displayed together in the inventory locations 712 such as in bins, on shelves, hanging from pegboards, and so forth. In this implementation, all items 114 of a given kind are stored in one inventory location 712. In other implementations, like items 114 may be stored in different inventory locations 712. For example, to optimize retrieval of certain items 114 having frequent turnover within a large physical facility 702, those items 114 may be stored in several different inventory locations 712 to reduce congestion that might occur at a single inventory location 712.

When a customer order specifying one or more items 114 is received, or as a user 714 progresses through the facility 702, the corresponding items 114 may be selected or "picked" from the inventory locations 712 containing those items 114. In various implementations, item picking may range from manual to completely automated picking. For example, in one implementation, a user 714 may have a list of items 114 they desire and may progress through the facility 702 picking items 114 from inventory locations 712 within the storage area 706 and placing those items 114 into a cart 716. In other implementations, employees of the facility 702 may pick items 114 using written or electronic pick lists derived from customer orders. These picked items 114 may be placed into the cart 716 as the employee progresses through the facility 702.

After items 114 have been picked, the items 114 may be processed at a transition area 708. The transition area 708 may be any designated area within the facility 702 where items 114 are transitioned from one location to another or from one entity to another. For example, the transition area 708 may be a packing station within the facility 702. When the item 114 arrives at the transition area 708, the item 114 may be transitioned from the storage area 706 to the packing station. Information about the transition may be maintained by the inventory management system 720.

In another example, if the items 114 are departing the facility 702, a list of the items 114 may be obtained and used by the inventory management system 720 to transition responsibility for, or custody of, the items 114 from the facility 702 to another entity. For example, a carrier may accept the items 114 for transport with that carrier accepting responsibility for the items 114 indicated in the list. In another example, a user 714 may purchase or rent the items 114 and remove the items 114 from the facility 702. During use of the facility 702, the user 714 may move about the facility 702 to perform various tasks, such as picking or placing the items 114 in the inventory locations 712.

To facilitate operation of the facility 702, the inventory management system 720 is configured to use the sensor data 926, such as data from weight sensors 302, image data, and other information such as item data 932, physical layout data 934, and so forth, to generate interaction data 938.

The interaction data 938 may provide information about an interaction, such as a pick of an item 114 from the inventory location 712, a place of an item 114 to the inventory location 712, a touch made to an item 114 at the inventory location 712, a gesture associated with an item 114 at the inventory location 712, and so forth. The interaction data 938 may include one or more of the type of interaction, interaction location identifier indicative of where from the inventory location 712 the interaction took place, item identifier, quantity change to the item 114, user identifier, and so forth. The interaction data 938 may then be used to further update the item data 932. For example, the quantity of items 114 on hand at a particular accessory 112 may be changed based on an interaction that picks or places one or more items 114.

As described above, the inventory management system 720 may perform other operations, determining inventory to restock, determining user billing data, and so forth.

Figure 8:
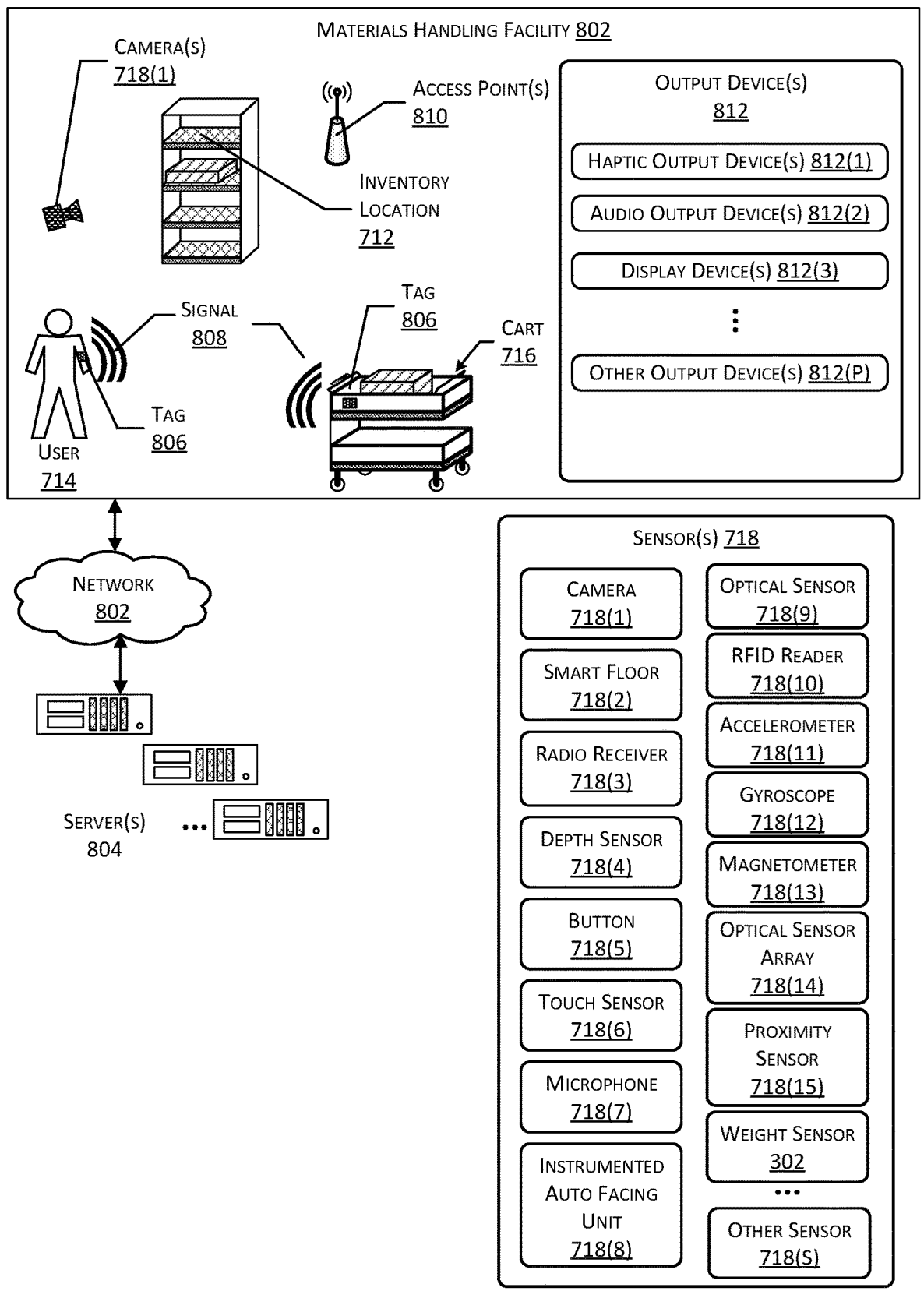
FIG. 8 is a block diagram illustrating additional details of the facility, according to some implementations.

FIG. 8 is a block diagram 800 illustrating additional details of the facility 702, according to some implementations. The facility 702 may be connected to one or more networks 802, which in turn connect to one or more computing devices, such as servers 804. The network 802 may include private networks such as an institutional or personal intranet, public networks such as the Internet, or a combination thereof. The network 802 may utilize wired technologies (e.g., wires, fiber optic cables, and so forth), wireless technologies (e.g., radio frequency, infrared, acoustic, optical, and so forth), or other connection technologies. The network 802 is representative of any type of communication network, including one or more of data networks or voice networks. The network 802 may be implemented using wired infrastructure (e.g., copper cable, fiber optic cable, and so forth), a wireless infrastructure (e.g., cellular, microwave, satellite, and so forth), or other connection technologies.

The servers 804 may be configured to execute one or more modules or software applications associated with the inventory management system 720 or other systems. While the servers 804 are illustrated as being in a location outside of the facility 702, in other implementations, at least a portion of the servers 804 may be located at the facility 702. The servers 804 are discussed in more detail below with regard to FIG. 9.

The user 714, the carts 716, items 114, or other objects in the facility 702 may be equipped with one or more tags 806. The tags 806 may be configured to emit a signal 808. In one implementation, the tag 806 may be a radio frequency identification (RFID) tag 806 configured to emit an RF signal 808 upon activation by an external signal. For example, the external signal may comprise a radio frequency signal or a magnetic field configured to energize or activate the RFID tag 806. In another implementation, the tag 806 may comprise a transmitter and a power source configured to power the transmitter. For example, the tag 806 may comprise a Bluetooth Low Energy (BLE) transmitter and battery. In other implementations, the tag 806 may use other techniques to indicate presence of the tag 806. For example, an acoustic tag 806 may be configured to generate an ultrasonic signal 808, which is detected by corresponding acoustic receivers. In yet another implementation, the tag 806 may be configured to emit an optical signal 808.

The inventory management system 720 may be configured to use the tags 806 for one or more of identification of the object, determining a location of the object, and so forth. For example, the user 714 may wear tags 806, the carts 716 may have tags 806 affixed, items 114 may have tags 806 affixed to their packaging, and so forth, which may be read and, based at least in part on signal strength, used to determine one or more of identity or location.

Generally, the inventory management system 720 or other systems associated with the facility 702 may include any number and combination of input components, output components, and servers 804.

The one or more sensors 718 may be arranged at one or more locations within the facility 702. For example, the sensors 718 may be mounted on or within a floor, wall, at a ceiling, at an inventory location 712, on a cart 716, may be carried or worn by a user 714, and so forth.

The sensors 718 may include one or more cameras 718(1) or other imaging sensors. The one or more cameras 718(1) may include imaging sensors configured to acquire images of a scene. The cameras 718(1) are configured to detect light in one or more wavelengths including, but not limited to, terahertz, infrared, visible, ultraviolet, and so forth. The cameras 718(1) may comprise charge coupled devices (CCD), complementary metal oxide semiconductor (CMOS) devices, microbolometers, and so forth. The inventory management system 720 may use image data acquired by the cameras 718(1) during operation of the facility 702. For example, the inventory management system 720 may identify items 114, users 714, carts 716, and so forth, based at least in part on their appearance within the image data acquired by the cameras 718(1). The cameras 718(1) may be mounted in various locations within the facility 702. For example, cameras 718(1) may be mounted overhead, on inventory locations 712, may be worn or carried by the user 714, may be affixed to carts 716, and so forth.

The sensors 718 may include a smart floor 718(2). The smart floor 718(2) is able to provide information about the location of objects, such as a user 714, carts 716, and so forth. This information may include identifying the object, determining a location of the object, tracking the object, and so forth. The smart floor 718(2) may utilize smart floor devices that comprise one or more of transmitters or receivers that radiate or receive electromagnetic signals from antennas located at or underneath the floor. Based on information about what antenna radiated a signal and what antenna acquired the signal, information about an object on or above the floor may be determined. For example, the smart floor 718(2) may comprise sensing elements, or segments. Each segment may include an antenna that is coupled to one or more of a transmitter or a receiver. During operation, the segment may transmit an electromagnetic signal 808 that is radiated by the antenna, receive an electromagnetic signal that is acquired by the antenna, or both. In some implementations the smart floor 718(2) may operate as a physically large touch sensor that is deployed at floor level. The electromagnetic signals 808 provide information about the presence of an object thereon. For example, the segments may electromagnetically couple to objects that are close by, allowing for the detection of objects that are either in contact with the floor or above the floor. In some implementations, instead of or in addition to the visual tracking of the object, the smart floor 718(2) may be used to provide object representation movement data. For example, the output from the segments obtained during a particular window of time may be processed in a fashion similar to the image data.

One or more radio receivers 718(3) may also be included as sensors 718. In some implementations, the radio receivers 718(3) may be part of transceiver assemblies. The radio receivers 718(3) may be configured to acquire RF signals 808 associated with RFID, Wi-Fi, Bluetooth, ZigBee, 4G, LTE, or other wireless data transmission technologies. The radio receivers 718(3) may provide information associated with data transmitted via radio frequencies, signal strength of RF signals 808, and so forth. For example, information from the radio receivers 718(3) may be used by the inventory management system 720 to determine a location of an RF source, such as a transmitter carried by the user 714, a transmitter on the cart 716, a tag 806 on the item 114, and so forth.

One or more depth sensors 718(4) may also be included in the sensors 718. The depth sensors 718(4) are configured to acquire spatial or three-dimensional (3D) data, such as depth information, about objects within a field-of-view (FOV). The depth sensors 718(4) may include range cameras, lidar systems, sonar systems, radar systems, structured light systems, stereo vision systems, optical interferometry systems, and so forth. The inventory management system 720 may use the 3D data acquired by the depth sensors 718(4) to identify objects, determine a location of an object in 3D real space, identify a user 714, and so forth.

One or more buttons 718(5) may be configured to accept input from the user 714. The buttons 718(5) may comprise mechanical, capacitive, optical, or other mechanisms. For example, the buttons 718(5) may comprise mechanical switches configured to accept an applied force from a touch of the user 714 to generate an input signal. The inventory management system 720 may use data from the buttons 718(5) to receive information from the user 714. For example, the cart 716 may be configured with a button 718(5) to accept input from the user 714 and send information indicative of the input to the inventory management system 720.

The sensors 718 may include one or more touch sensors 718(6). The touch sensors 718(6) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 720 may use data from the touch sensors 718(6) to receive information from the user 714. For example, the touch sensor 718(6) may be integrated with the cart 716 to provide a touchscreen with which the user 714 may select, from a menu, one or more particular items 114 for picking, enter a manual count of items 114 at an inventory location 712, and so forth.

One or more microphones 718(7) may be configured to acquire information indicative of sound present in the environment. In some implementations, arrays of microphones 718(7) may be used. These arrays may implement beam-forming techniques to provide for directionality of gain. The inventory management system 720 may use the one or more microphones 718(7) to acquire information from acoustic tags 806, accept voice input from the user 714, determine ambient noise level, and so forth.

The sensors 718 may include instrumented auto facing units (IAFUs) 718(8). The IAFU 718(8) may comprise a position sensor configured to provide data indicative of displacement of a pusher. As an item 114 is removed from the IAFU 718(8), the pusher moves, such as under the influence of a spring, and pushes the remaining items 114 in the IAFU 718(8) to the front of the inventory location 712. By using data from the position sensor, and given item data 932 such as a depth of an individual item 114, a count may be determined, based on a change in position data. For example, if each item 114 is 1 inch deep, and the position data indicates a change of 10 inches, the quantity held by the IAFU 718(8) may have changed by 10 items 114. This count information may be used to confirm or provide a cross check for a count obtained by other means, such as analysis of the sensor data 926 from the weight sensors 302.

The sensors 718 may include one or more optical sensors 718(9). The optical sensors 718(9) may be configured to provide data indicative of one or more of color or intensity of light impinging thereupon. For example, the optical sensor 718(9) may comprise a photodiode and associated circuitry configured to generate a signal 808 or data indicative of an incident flux of photons. As described below, the optical sensor array 718(14) may comprise a plurality of the optical sensors 718(9). The optical sensors 718(9) may include photodiodes, photoresistors, photovoltaic cells, quantum dot photoconductors, bolometers, pyroelectric infrared detectors, and so forth. For example, the optical sensor 718(9) may use germanium photodiodes to detect infrared light.

One or more radio frequency identification (RFID) readers 718(10), near field communication (NFC) systems, and so forth, may be included as sensors 718. For example, the RFID readers 718(10) may be configured to read the RF tags 806. Information acquired by the RFID reader 718(10) may be used by the inventory management system 720 to identify an object associated with the RF tag 806 such as the item 114, the user 714, the cart 716, and so forth. For example, based on information from the RFID readers 718(10) detecting the RF tag 806 at a particular inventory location, an item 114 being placed or picked may be determined.

The sensors 718 may include one or more accelerometers 718(11), which may be worn or carried by the user 714, mounted to the cart 716, and so forth. The accelerometers 718(11) may provide information such as the direction and magnitude of an imposed acceleration. Data such as rate of acceleration, determination of changes in direction, speed, and so forth, may be determined using the accelerometers 718(11).

A gyroscope 718(12) may provide information indicative of rotation of an object affixed thereto. For example, the cart 716 or other objects may be equipped with a gyroscope 718(12) to provide data indicative of a change in orientation of the object.

A magnetometer 718(13) may be used to determine an orientation by measuring ambient magnetic fields, such as the terrestrial magnetic field. The magnetometer 718(13) may be worn or carried by the user 714, mounted to the cart 716, and so forth. For example, the magnetometer 718(13) mounted to the cart 716 may act as a compass and provide information indicative of which direction the cart 716 is oriented.

An optical sensor array 718(14) may comprise one or optical sensors 718(9). The optical sensors 718(9) may be arranged in a regular, repeating, or periodic two-dimensional arrangement such as a grid. The optical sensor array 718(14) may generate image data. For example, the optical sensor array 718(14) may be arranged within or below an inventory location 712 and obtain information about shadows of items 114, hand of the user 714, and so forth.

The sensors 718 may include proximity sensors 718(15) used to determine presence of an object, such as the user 714, the cart 716, and so forth. The proximity sensors 718(15) may use optical, electrical, ultrasonic, electromagnetic, or other techniques to determine a presence of an object. In some implementations, the proximity sensors 718(15) may use an optical emitter and an optical detector to determine proximity. For example, an optical emitter may emit light, a portion of which may then be reflected by the object back to the optical detector to provide an indication that the object is proximate to the proximity sensor 718(15). In other implementations, the proximity sensors 718(15) may comprise a capacitive proximity sensor 718(15) configured to provide an electrical field and determine a change in electrical capacitance due to presence or absence of an object within the electrical field.

The proximity sensors 718(15) may be configured to provide sensor data 926 indicative of one or more of a presence or absence of an object, a distance to the object, or characteristics of the object. An optical proximity sensor 718(15) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 718 such as a camera 718(1). Based on an apparent distance between the features of the structured light pattern, the distance to the object may be calculated. Other techniques may also be used to determine distance to the object. In another example, the color of the reflected light may be used to characterize the object, such as skin, clothing, cart 716, and so forth.

The one or more weight sensors 302 are configured to measure the weight of a load, such as the item 114, the cart 716, or other objects. The weight sensors 302 may be configured to measure the weight of the load at one or more of the inventory locations 712, the cart 716, on the floor of the facility 702, and so forth. For example, a fixture of the inventory location 712 may include a plurality of weight sensors 302. The weight sensors 302 may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 302 may operate as transducers that generate one or more signals based on an applied force, such as that of the load due to gravity. For example, the weight sensor 302 may comprise a load cell having a strain gauge and a structural member that deforms slightly when weight is applied. By measuring a change in the electrical characteristic of the strain gauge, such as capacitance or resistance, the weight may be determined. In another example, the weight sensor 302 may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 720 may use the data acquired by the weight sensors 302 to identify an object, determine a change in the quantity of objects, determine a location of an object, maintain shipping records, and so forth.

The sensors 718 may include other sensors 718(S) as well. For example, the other sensors 718(S) may include light curtains, ultrasonic rangefinders, thermometers, barometric sensors, hygrometers, and so forth.

In some implementations, the sensors 718 may include hardware processors, memory, and other elements configured to perform various functions. For example, the cameras 718(1) may be configured to generate image data, send the image data to another device such as the server 804, and so forth.

The facility 702 may include one or more access points 810 configured to establish one or more wireless networks. The access points 810 may use Wi-Fi, NFC, Bluetooth, or other technologies to establish wireless communications between a device and the network 802. The wireless networks allow the devices to communicate with one or more of the sensors 718, the inventory management system 720, the tags 806, a communication device of the cart 716, or other devices.

Output devices 812 may also be provided in the facility 702. The output devices 812 are configured to generate signals 808, which may be perceived by the user 714 or detected by the sensors 718. In some implementations, the output devices 812 may be used to provide illumination of the optical sensor array 718(14).

Haptic output devices 812(1) are configured to provide a signal 808 that results in a tactile sensation to the user 714. The haptic output devices 812(1) may use one or more mechanisms such as electrical stimulation or mechanical displacement to provide the signal 808. For example, the haptic output devices 812(1) may be configured to generate a modulated electrical signal, which produces an apparent tactile sensation in one or more fingers of the user 714. In another example, the haptic output devices 812(1) may comprise piezoelectric or rotary motor devices configured to provide a vibration, which may be felt by the user 714.

One or more audio output devices 812(2) may be configured to provide acoustic output. The acoustic output includes one or more of infrasonic sound, audible sound, or ultrasonic sound. The audio output devices 812(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display devices 812(3) may be configured to provide output, which may be seen by the user 714 or detected by a light-sensitive sensor such as a camera 718(1) or an optical sensor 718(9). In some implementations, the display devices 812(3) may be configured to produce output in one or more of infrared, visible, or ultraviolet light. The output may be monochrome or in color. The display devices 812(3) may be one or more of emissive, reflective, microelectromechanical, and so forth. An emissive display device 812(3), such as using LEDs, is configured to emit light during operation. In comparison, a reflective display device 812(3), such as using an electrophoretic element, relies on ambient light to present an image. Backlights or front lights may be used to illuminate non-emissive display devices 812(3) to provide visibility of the output in conditions where the ambient light levels are low.

The display devices 812(3) may be located at various points within the facility 702. For example, the addressable displays may be located on inventory locations 712, carts 716, on the floor of the facility 702, and so forth.

Other output devices 812(P) may also be present. For example, the other output devices 812(P) may include scent/odor dispensers, document printers, 3D printers or fabrication equipment, and so forth.

Figure 9:
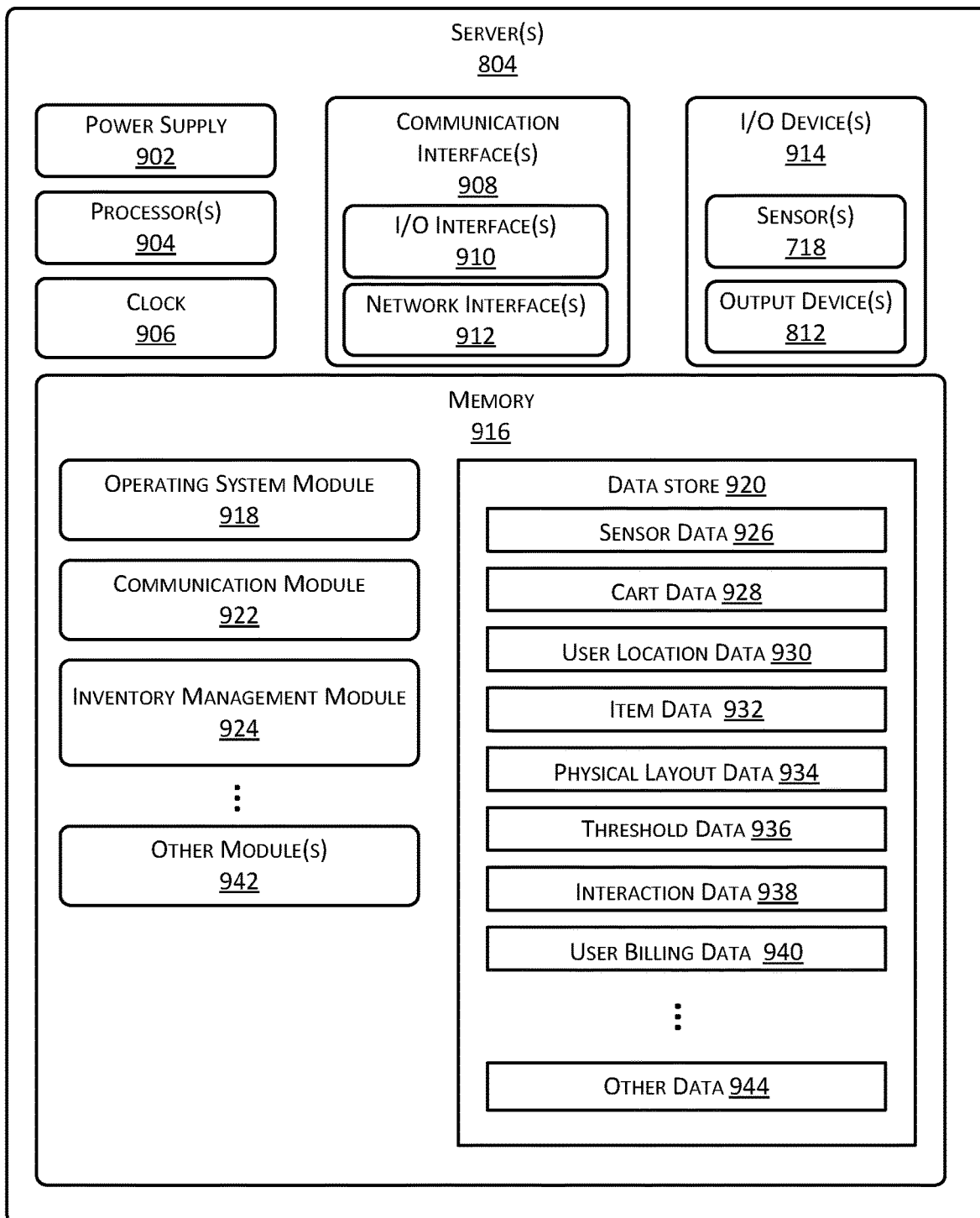
FIG. 9 is a block diagram of a server to support operation of the facility, according to some implementations.

FIG. 9 illustrates a block diagram 900 of a server 804 configured to support operation of the facility 702, according to some implementations. The server 804 may be physically present at the facility 702, may be accessible by the network 802, or a combination of both. The server 804 does not require end-user knowledge of the physical location and configuration of the system that delivers the services. Common expressions associated with the server 804 may include "on-demand computing", "software as a service (SaaS)", "platform computing", "network-accessible platform", "cloud services", "data centers", and so forth. Services provided by the server 804 may be distributed across one or more physical or virtual devices.

One or more power supplies 902 may be configured to provide electrical power suitable for operating the components in the server 804. The one or more power supplies 902 may comprise batteries, capacitors, fuel cells, photovoltaic cells, wireless power receivers, conductive couplings suitable for attachment to an external power source such as provided by an electric utility, and so forth. The server 804 may include one or more hardware processors 904 (processors) configured to execute one or more stored instructions. The processors 904 may comprise one or more cores. One or more clocks 906 may provide information indicative of date, time, ticks, and so forth. For example, the processor 904 may use data from the clock 906 to associate a particular interaction with a particular point in time.

The server 804 may include one or more communication interfaces 908 such as input/output (I/O) interfaces 910, network interfaces 912, and so forth. The communication interfaces 908 enable the server 804, or components thereof, to communicate with other devices or components. The communication interfaces 908 may include one or more I/O interfaces 910. The I/O interfaces 910 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 910 may couple to one or more I/O devices 914. The I/O devices 914 may include input devices such as one or more of a sensor 718, keyboard, mouse, scanner, and so forth. The I/O devices 914 may also include output devices 812 such as one or more of a display device 812(3), printer, audio speakers, and so forth. In some embodiments, the I/O devices 914 may be physically incorporated with the server 804 or may be externally placed.

The network interfaces 912 may be configured to provide communications between the server 804 and other devices, such as the carts 716, routers, access points 810, and so forth. The network interfaces 912 may include devices configured to couple to personal area networks (PANs), local area networks (LANs), wireless local area networks (WLANS), wide area networks (WANs), and so forth. For example, the network interfaces 912 may include devices compatible with Ethernet, Wi-Fi, Bluetooth, ZigBee, and so forth.

The server 804 may also include one or more busses or other internal communications hardware or software that allow for the transfer of data between the various modules and components of the server 804.

As shown in FIG. 9, the server 804 includes one or more memories 916. The memory 916 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 916 provides storage of computer-readable instructions, data structures, program modules, and other data for the operation of the server 804. A few example functional modules are shown stored in the memory 916, although the same functionality may alternatively be implemented in hardware, firmware, or as a system on a chip (SoC).

The memory 916 may include at least one operating system (OS) module 918. The OS module 918 is configured to manage hardware resource devices such as the I/O interfaces 910, the I/O devices 914, the communication interfaces 908, and provide various services to applications or modules executing on the processors 904. The OS module 918 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 916 may be a data store 920 and one or more of the following modules. These modules may be executed as foreground applications, background tasks, daemons, and so forth. The data store 920 may use a flat file, database, linked list, tree, executable code, script, or other data structure to store information. In some implementations, the data store 920 or a portion of the data store 920 may be distributed across one or more other devices including the servers 804, network attached storage devices, and so forth.

A communication module 922 may be configured to establish communications with one or more of the carts 716, sensors 718, display devices 812(3), other servers 804, or other devices. The communications may be authenticated, encrypted, and so forth.

The memory 916 may store an inventory management module 924. The inventory management module 924 is configured to provide the inventory functions as described herein with regard to the inventory management system 720. For example, the inventory management module 924 may track items 114 between different inventory locations 712, to and from the carts 716, generate restocking orders, direct operation of robots within the facility 702, and so forth. The inventory management module 924 may access sensor data 926 such as one or more of weight data from the weight sensors 302, image data, received data, and so forth.

Information used by the inventory management module 924 may be stored in the data store 920. For example, the data store 920 may be used to store the sensor data 926, cart data 928, user location data 930, item data 932, physical layout data 934, threshold data 936, interaction data 938, user billing data 940, and so forth.

The cart data 928 comprises information about the items 114 that are determined to be in the custody of the user 714. For example, the cart data 928 may indicate the items 114 that are within the cart 716 that is associated with the account of the user 714, currently being carried by the user 714, and so forth. The cart data 928 may be based at least in part on the interaction data 938. For example, the interaction data 938 may be associated with a particular user 714, changing the contents of the cart data 928 based on the interaction.

The inventory management module 924 may generate the user location data 930 that is indicative of the location of the user 714 within the facility 702. For example, the inventory management module 924 may use image data obtained by the cameras 718(1) to determine a location of the user 714. In other implementations, other techniques may be used for determining the user location data 930. For example, data from the smart floor 718(2) may be used to determine the location of the user 714. Based on the user location data 930 and the interaction data 938, a particular interaction may be associated with an account of a particular user 714. For example, if the user location data 930 indicates that the user 714 is present in front of inventory location 712(492) at time 17:47:20 and the interaction data 938 indicates a pick of a quantity of one item 114(D) from bracket 88(7) on device 100(1) of inventory location 712(492) at 17:47:27, the user 714 may be billed for that pick.

The threshold data 936 comprises the various thresholds used by the system. For example, the threshold data 936 may specify values for confidence thresholds that are used to determine if a hypothesis is deemed suitable to be used to generate the interaction data 938.

The inventory management module 924 may generate user billing data 940 based on the cart data 928. For example, when a user 714 leaves the facility 702, the items in the cart data 928 and their respective quantities may be used to generate user billing data 940. In some implementations, the user billing data 940 may be used to bill a payment account associated with the user 714.

The inventory management module 924 may utilize the physical layout data 934 during operation. The physical layout data 934 may provide information indicative of where cameras 718(1), weight sensors 302, antennas for the radio receivers 718(3), inventory locations 712, and so forth are in the facility 702 with respect to one another. For example, the physical layout data 934 may comprise information representative of a map or floor plan of the facility 702 with relative positions of inventory locations 712 and cameras 718(1).

The inventory management module 924 may process the sensor data 926 and generate output data. For example, based on the interaction data 938, a quantity of a type of item 114 at a particular inventory location 712 may drop below a threshold restocking level. The system may generate output data comprising a restocking order indicative of the inventory location 712 and a quantity needed to replenish stock to a predetermined level. The restocking order may then be used to direct a robot to restock that inventory location 712.

Other modules 942 may also be present in the memory 916 as well as other data 944 in the data store 920.

The implementations described above are provided for illustration, and not necessarily as limitations. For example, the fixtures may support different numbers of accessories 112, combinations of different accessories on the same fixture, and so forth.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques and devices described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. An apparatus comprising:
   an extruded crossbar having a front side, a back side, a left end, a right end, a top side, and a bottom side, wherein the extruded crossbar further comprises:
      a first channel feature that extends from the front side of the extruded crossbar,
      a second channel feature that extends from the front side of the extruded crossbar,
      a third channel feature that extends from the back side of the extruded crossbar, and
      a fourth channel feature that extends from the back side of the extruded crossbar;
   a left end piece comprising a first flange, a second flange, and a first plurality of shelf hooks, wherein the left end piece is attached to the left end of the extruded crossbar using:
      a first removeable fastener that passes through the first flange, the first channel feature, the third channel feature proximate to the left end of the extruded crossbar, and the second flange, and
      a second removeable fastener that passes through the first flange, the second channel feature, the fourth channel feature proximate to the left end of the extruded crossbar, and the second flange;
   a right end piece comprising a third flange, a fourth flange, and a second plurality of shelf hooks, wherein the right end piece is attached to the right end of the extruded crossbar using:
      a third removeable fastener that passes through the third flange, the first channel feature, the third channel feature proximate to the right end of the extruded crossbar, and the fourth flange, and
      a fourth removeable fastener that passes through the third flange, the second channel feature, the fourth channel feature proximate to the right end of the extruded crossbar, and the fourth flange;
   a load cell arm having a first end and a second end, wherein the first end is attached to the bottom side of the extruded crossbar using:
      a fifth removeable fastener that passes through the top side and the bottom side of the extruded crossbar and into at least a portion of the first end of the load cell arm, and
      a sixth removeable fastener that passes through the top side and the bottom side of the extruded crossbar and into at least a portion of the first end of the load cell arm;
   a load cell sensor affixed to the load cell arm;
   an accessory support piece having a front side, a back side, and a top side, wherein the second end of the load cell arm is attached to the back side of the accessory support piece using two removeable fasteners; and
   a cover that encloses at least a portion of the extruded crossbar.

2. The apparatus of claim 1, further comprising:
   an accessory comprising:
      an engagement feature that mechanically engages a portion of the accessory support piece; and
      one or more of a hook, bin, basket, shelf, autofacing unit, or dispenser.

3. The apparatus of claim 1, further comprising:
   a first groove extending from the left end to the right end of the extruded crossbar on the top side;
   a second groove extending from the left end to the right end of the extruded crossbar on the bottom side;
   a third groove extending from the left end to the right end of the extruded crossbar on the top side;
   a fourth groove extending from the left end to the right end of the extruded crossbar on the bottom side; and
   wherein the third removeable fastener is centered on the first groove and the second groove and the fourth removeable fastener is centered on the third groove and the fourth groove.

4. The apparatus of claim 1, further comprising:
   circuitry attached to the back side of the extruded crossbar, wherein the circuitry generates weight data indicative of a load on the accessory support piece.

5. An apparatus comprising:
   an extruded crossbar having a front side, a back side, a left end, a right end, a top side, and a bottom side, wherein the front side and the back side comprise:
      a first feature that extends from the front side of the extruded crossbar and is proximate to the top side,

23 a second feature that extends from the front side of the extruded crossbar and is proximate to the bottom side,
a third feature that extends from the back side of the extruded crossbar and is proximate to the top side,
a fourth feature that extends from the back side of the extruded crossbar and is proximate to the bottom side;
a weight sensor having a first end and a second end, wherein the first end is attached to the bottom side of the extruded crossbar using one or more removeable fasteners; and
an accessory support piece having a front side, a back side, and a top side, wherein the second end of the weight sensor is attached to the accessory support piece using one or more removeable fasteners.

6. The apparatus of claim 5, wherein the weight sensor comprises:
a load cell arm; and
a load cell sensor affixed to at least a portion of the load cell arm.

7. The apparatus of claim 5, further comprising:
a cover that encloses at least a portion of the extruded crossbar, wherein the cover comprises a fifth feature that engages one or more of the first feature, the second feature, the third feature, or the fourth feature.

8. The apparatus of claim 5, wherein a cross section perpendicular to a long axis of the extruded crossbar for each of the first feature, the second feature, the third feature, and the fourth feature comprises a first width of an interior space and a second width of an opening that is less than the first width.

9. The apparatus of claim 5, further comprising:
one or more electrical conductors arranged between the third feature and the fourth feature on the back side of the extruded crossbar, wherein the weight sensor is connected to the one or more electrical conductors; and
electronics connected to the one or more electrical conductors that generate weight data based on output from the weight sensor.

10. The apparatus of claim 5, further comprising:
a left end piece comprising:
one or more first shelf hooks;
a first flange;
a second flange; and
wherein the left end piece is attached to the left end of the extruded crossbar using:
a first removeable fastener that passes through the first flange, the first feature, the third feature, and the second flange, and
a second removeable fastener that passes through the first flange, the second feature, the fourth feature, and the second flange; and
a right end piece comprising:
one or more second shelf hooks;
a third flange;
a fourth flange; and
wherein the right end piece is attached to the right end of the extruded crossbar using:
a third removeable fastener that passes through the third flange, the first feature, the third feature, and the fourth flange, and
a fourth removeable fastener that passes through the third flange, the second feature, the fourth feature, and the fourth flange.

11. The apparatus of claim 5, further comprising:

24 a tab that extends from a top side of the accessory support piece.

12. The apparatus of claim 5, further comprising:
a first groove extending from the left end to the right end of the extruded crossbar on the top side;
a second groove extending from the left end to the right end of the extruded crossbar on the bottom side;
a third groove extending from the left end to the right end of the extruded crossbar on the top side;
a fourth groove extending from the left end to the right end of the extruded crossbar on the bottom side; and
wherein at least one of the one or more removeable fasteners that attach the first end of the weight sensor to the extruded crossbar are centered on either:
the first groove and the second groove, or
the third groove and the fourth groove.

13. An apparatus comprising:
a crossbar having a front side, a back side, a left end, a right end, a top side, and a bottom side, wherein the front side and the back side comprise:
a first feature that extends from the front side of the crossbar and is proximate to the top side,
a second feature that extends from the front side of the crossbar and is proximate to the bottom side,
a third feature that extends from the back side of the crossbar and is proximate to the top side, and
a fourth feature that extends from the back side of the crossbar and is proximate to the bottom side;
a bracket having a first end attached to the bottom side of the crossbar using at least one or more removable fasteners that extend from the top side of the crossbar to the bottom side of the crossbar and the bracket having a second end; and
a load cell sensor affixed to at least a portion of the bracket.

14. The apparatus of claim 13, wherein the bracket comprises a unitary structure.

15. The apparatus of claim 13, wherein the bracket comprises:
a load cell arm, wherein the load cell sensor is affixed to at least a portion of the load cell arm; and
an accessory support piece having a front side, a back side, and a top side, wherein the accessory support piece is attached to the load cell arm.

16. The apparatus of claim 13, further comprising:
a cover that encloses at least a portion of the crossbar, wherein the cover comprises a fifth feature that engages one or more of the first feature, the second feature, the third feature, or the fourth feature.

17. The apparatus of claim 13, wherein a cross section perpendicular to a long axis of the crossbar for each of the first feature, the second feature, the third feature, and the fourth feature comprises a first width of an interior space and a second width of an opening that is less than the first width.

18. The apparatus of claim 13, further comprising:
one or more electrical conductors arranged between the third feature and the fourth feature on the back side of the crossbar, wherein the load cell sensor is connected to the one or more electrical conductors; and
electronics connected to the one or more electrical conductors that generate weight data based on output from the load cell sensor.

19. The apparatus of claim 13, further comprising:
an end piece comprising:
one or more shelf hooks;
a first flange;
a second flange; and wherein the end piece is attached to the left end or the right end of the crossbar using:
a first removeable fastener that passes through the first flange, the first feature, the third feature, and the second flange, and
a second removeable fastener that passes through the first flange, the second feature, the fourth feature, and the second flange.

20. The apparatus of claim 13, further comprising:
a first groove extending from the left end to the right end of the crossbar on the top side;
a second groove extending from the left end to the right end of the crossbar on the bottom side;
a third groove extending from the left end to the right end of the crossbar on the top side;
a fourth groove extending from the left end to the right end of the crossbar on the bottom side; and
wherein the at least one or more removeable fasteners are centered on either:
the first groove and the second groove, or
the third groove and the fourth groove.

* * * * *